United States Patent [19]

Sidhu et al.

[11] Patent Number: 5,734,901
[45] Date of Patent: Mar. 31, 1998

[54] ELECTRONIC MAIL INFORMATION ASSOCIATED WITH NATIVE APPLICATION DATA

[75] Inventors: Gursharan S. Sidhu; Stephen Fisher, both of Menlo Park; Patrick A. Holleran, Santa Cruz; Michael Andrew Cleron, Menlo Park, all of Calif.

[73] Assignee: Apple Computer, Inc., Cupertino, Calif.

[21] Appl. No.: 534,121

[22] Filed: Sep. 26, 1995

Related U.S. Application Data

[63] Continuation of Ser. No. 23,351, Feb. 26, 1993, abandoned.
[51] Int. Cl.⁶ ............................................. G06F 13/00
[52] U.S. Cl. ............................................. 395/680
[58] Field of Search ............................ 395/650, 700, 395/680

[56] References Cited

U.S. PATENT DOCUMENTS

| | | | |
|---|---|---|---|
| 5,115,326 | 5/1992 | Burgess et al. | 358/440 |
| 5,245,532 | 9/1993 | Mowier | 395/400 |
| 5,252,951 | 10/1993 | Tannenbaum et al. | 395/156 |
| 5,283,887 | 2/1994 | Zachery | 395/500 |
| 5,377,354 | 12/1994 | Scannell et al. | 395/650 |
| 5,418,908 | 5/1995 | Keller et al. | 395/200.01 |
| 5,438,660 | 8/1995 | Lee et al. | 395/345 |
| 5,544,360 | 8/1996 | Lewak et al. | 395/601 |

*Primary Examiner*—Kevin A. Kriess
*Assistant Examiner*—John Q. Chavis
*Attorney, Agent, or Firm*—Blakely, Sokoloff, Taylor & Zafman

[57] ABSTRACT

A computer implemented method and apparatus for providing the functions of electronic mail in a computer system which is integrated within a display or a window under control of a first application program which does not support electronic mail functionality. A set if mail routines displays a mailer on a first portion of the application program's display with application program data displayed in a second portion of the application program's display. The mail routines allow the user to modify the data in the application program via functionality of the application program and modify the mailer via the functionality of the mail routines. The mail routines further allow the user to perform electronic mail functions provided by the mail routines, wherein the electronic mail functions include using the application program data as content of mail messages processed by the mail routines. The functionality of the mail routines can be provided via an event preprocessor inserted into an event processing loop in the application program, wherein the event preprocessor determines whether events are pertinent to the mail routines. If so, the preprocessor processes the events to provide the electronic mail functionality and allows events which are pertinent to the application program to be processed by the application program.

18 Claims, 33 Drawing Sheets

ELECTRONIC MAIL INFORMATION ASSOCIATED WITH NATIVE APPLICATION DATA

This is a continuation of application Ser. No. 08/023,351, filed Feb. 26, 1993, now abandoned.

BACKGROUND OF THE INVENTION

1. Field of the Invention

The present invention relates to the field of computer-controlled display systems. More particularly, the field of the invention relates to a computer system that has a means for communicating, such as an electronic mail system, and a graphical user interface (GUI) display under computer control.

2. Background Information

It is increasingly a requirement in modern computer systems to provide the capability to electronically communicate between computers to allow for shared transmission and manipulation of information. One way in which such communication has been enabled is through the use of "electronic mail" which allows the transmission and reception of user-generated messages between computer systems. Like the post office mail system wherein letters and packages may be sent from one address to another, in an electronic mail system, messages and other information may be transmitted from one computer system to another. Included with each transmitted message is typically other information regarding the date the information was sent, subject to which the message pertains, other users or computer systems which may receive the message. The user may also include with the message enclosures (also known as attachments—files, or sets of files contained in a directory), and a message for the recipient. Like the post office analogy, typical prior an electronic mail systems have also provided capabilities for forwarding mail messages, responding to mail messages, opening the messages, and removing items (files) included with the message. Prior art mail systems, however, have suffered from several disadvantages.

One disadvantage of prior an mail systems is that they are dedicated application programs. Some systems have required that the user input the data in the format required by the mail system. If a mail program requires text, the user cannot use graphics. Although some mail systems have allowed graphics, sound, or other information, none of the mail systems are integrated with existing user application programs which the user is familiar with. The prior art provides no means for user application processes which do not support electronic mail to operate with mail features. Returning to the post office analogy, a person can mail whatever he wants. He can send a letter, a package, greeting card, postcard, etc. Electronic mail users should similarly be able to send any type of data from any type of application program without having to learn the use of a separate dedicated mail application program.

There is also currently no link between the mail information and underlying application program data other than the data being included as an enclosure (a file transmitted with the message) in certain prior an electronic mail systems. Prior art mail systems, such as the Microsoft Mail brand system available from Microsoft Corporation of Redmond, Wash., have associated mail information with some application program data, however, there has been no visual integration of the mail information with the application program data by means of a singular display window or similar presentation. Also, certain prior an systems do not allow the viewing, by the user, of data from different file formats from within the electronic mail application program. Again, the user is limited to the type of data for which the mail system is designed. In other words, if the mail system supports text, then graphic information cannot be displayed while within the mail system. The user must enclose with the message and remove, using an "enclosures" file option or other action, the files containing data which the mail system does not support. Then, the user must view the data using a separate application program. If the user does not have the application program that created the data, then he may be unable to view the data.

Yet another shortcoming of prior art electronic mail and other application programs is the variety of ways in which an entity may be specified. Some electronic mail systems, for example, allow the specification of entities, such as user names or electronic mail addresses to which a message is to be sent, to be retrieved using search techniques. For example, a "string" search may be performed in given entity directories. Other systems provide techniques wherein a user may maintain a "personal" or local directory of entities which the user frequently uses. Similar to the "file" dialog box in the Macintosh brand operating system, "browsing" capabilities have also been provided in some mail systems wherein various paths or directories may be scanned on a hierarchical file system to scan for requested entity names. In still other prior art systems, direct input of entity names or entity addresses may be specified. No system to date, however, has provided an integration of all these capabilities into a single user interface.

Yet another shortcoming of prior art electronic mail systems, including other file transmission systems, is that no user interface has been provided for electronically verifying the origin of the message from a specific entity.

Yet another shortcoming of prior art systems is the lack of a capability of associating mail information with data from a native application program, including the ability to condense such mail information, to allow the user to operate on the native application data without distractions from the mail information.

Thus, in summary, prior art interfaces for electronic mail and other message-passing systems in the prior art suffer from many shortcomings.

SUMMARY AND OBJECTS OF THE INVENTION

One of the objects of the present invention is to provide an integrated system wherein electronic mail and other shared activities may be available under a variety of user application program windows.

Another object of the present invention is to provide an integrated display of native application program data and electronic mail information.

Yet another of the objects of the present invention is to provide a capability wherein data may be transmitted in an electronic mail system in a variety of data formats, and recipients are able to view and/or manipulate the data without having the application program which created the data.

Yet another of the objects of the present invention is to provide a system wherein easy viewing and manipulation of electronic mail information, such as chains of forwarding, may be maintained.

Yet another of the objects of the present invention is to provide an improved interface for electronic mail with application program data which allows a user to minimize such electronic mail information and avoid the distractions posed by such information while working in application program data.

Yet another of the objects of the present invention is to provide an integrated method for retrieving information about entities such as electronic mail addresses and/or file information.

Yet another of the objects of the present invention is to provide an interface which allows verification of the source of a received message in an electronic mail system.

Yet another of the objects of the present invention is to provide improved user interface objects for activating features with an electronic mail window which are associated with fields in the window.

These and other objects of the present invention are provided for by a method and apparatus for integrating electronic mail into application programs. The method comprises associating a mailer with data native to an application program. The mailer has a header including: a origination field indicating the user from which the mailer is received; a destination field indicating the user(s) to whom the mailer is addressed; a subject field indicating a subject to which the mailer pertains; and an enclosures field indicating any additional files to be associated and transmitted with the mailer. Further, a content field is associated with the mailer including multiple representations of the data for the application program. The multiple representations of data include, in one embodiment, a first representation of the data stored in a native format of the application program, and a second representation of the data stored in an interchange format to allow reading by other application programs than the application program. In another embodiment, an image may be transmitted, in addition to the other types of data transmitted. In this manner, a receiving user may view the data, even if he does not have the application program which created it. In one embodiment, the mailer is associated with the content through an event preprocessor inserted into an event processing loop in the application program.

These and other objects of the present invention are provided for by a method and apparatus for displaying a mailer for controlling the functions of electronic mail in a computer system, the mailer being integrated with data from a first application program. The mailer comprises a representation on a computer system display which is attached to a first set of data native to the first application program while a user is operating within the first application program. The mailer comprises: an origination field indicating from whom the mailer is addressed; a destination field indicating to whom the mailer is addressed; a subject field indicating a subject to which the mailer pertains; an enclosures field indicating any additional files to be associated with the mailer; a contraction/expansion toggle for compressing the representation of the mailer to a condensed representation above the native application data, and further for expanding the representation of the mailer to an original expanded state above the native application data; and a plurality of user selection activation means for activating functions within the mailer upon the selection by a user. These devices may include: a selection activation means associated with the origination field for indicating which user the mailer is addressed from; an address activation means for activating an addressing function which allows a user to specify to which users the mailer is addressed; and a selection activation means associated with the enclosures field for activating a process which allows the user to specify files which are to be associated with the mailer or retrieve files from the mailer. In one embodiment, the mailer comprises a window affixed to the top of the native application data on the computer system display. Further, the mailer may comprise a second mailer overlaid on the mailer. This second mailer has similar properties to these of the mailer, and it indicates a user from which the information has been forwarded. The second mailer comprises a means for switching between the mailer and the second mailer. This may include an icon which represents a "turned up" corner to simulate turning pages in a book.

BRIEF DESCRIPTION OF THE DRAWINGS

The present invention is illustrated by way of example and not limitation in the figures of the accompanying in which like references indicate like elements and in which.

DETAILED DESCRIPTION

A process and apparatus for an improved user interface display specifically for use with electronic mail applications in a computer-controlled display system is described. In the following description, specific steps, procedures, command options, command items, and other specifics are set forth in order to provide a thorough understanding of the present invention. However, it will be apparent to one skilled in the art that the present invention may be practiced without these specific details. In other instances, well-known systems and methods are shown in diagrammatic, block or flow diagram form in order to not unnecessarily obscure the present invention.

System of the Preferred Embodiment

Figure 1:
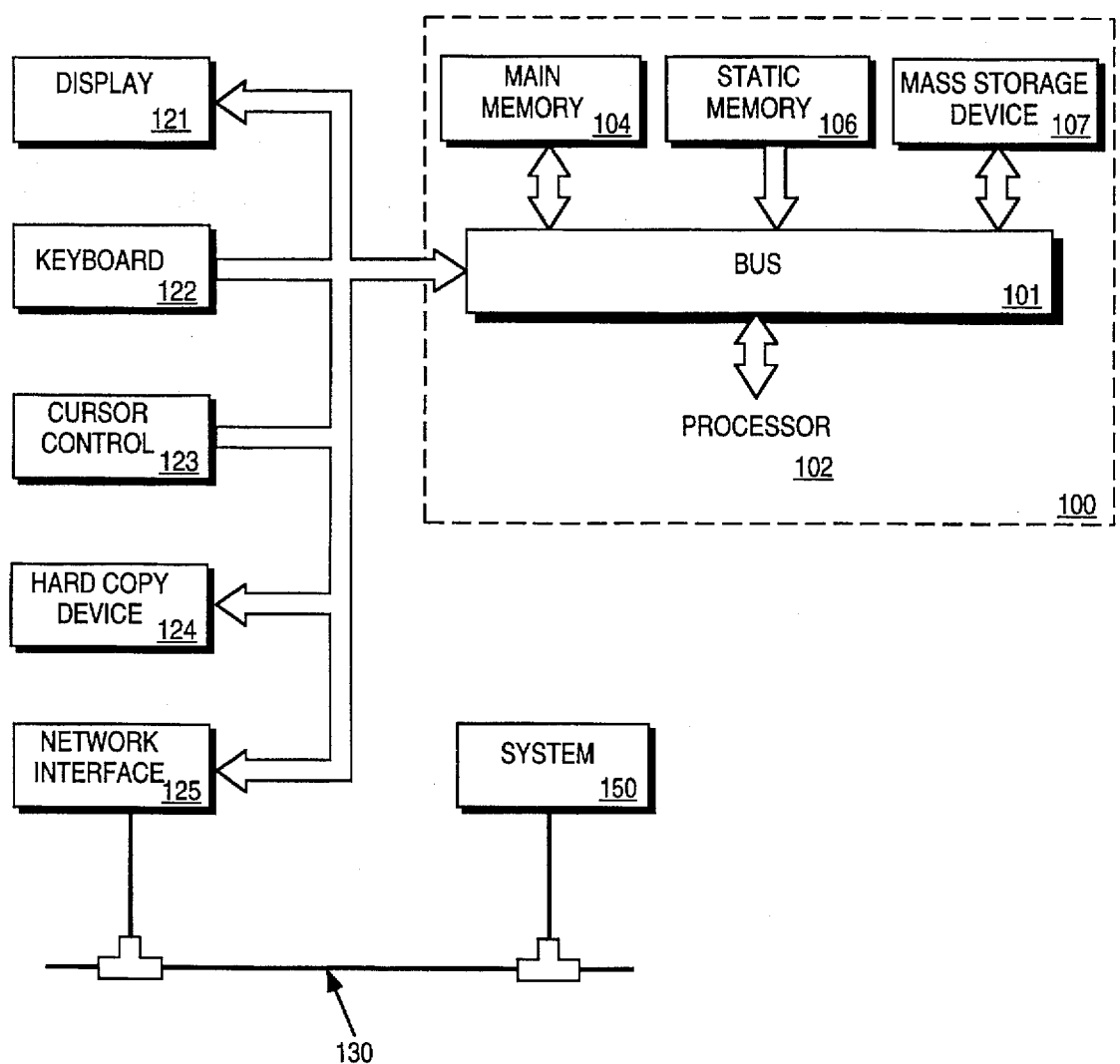
FIG. 1 shows a block diagram of a system on which the preferred embodiment may be implemented.

Referring to FIG. 1, the computer system upon which a preferred embodiment of the present invention is implemented is shown as 100. 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions. Computer system 100 may further be coupled to a display device 121, such as a cathode ray tube (CRT) or liquid crystal display (LCD) coupled to bus 101 for displaying information to a computer user. An alphanumeric input device 122, including alphanumeric and other keys, may also be coupled to bus 101 for communicating information and command selections to processor 102. An additional user input device is cursor control 123, such as a mouse, a trackball, stylus, or cursor direction keys, coupled to bus 101 for communicating direction information and command selections to processor 102, and for controlling cursor movement on display 121. Another device which may be coupled to bus 101 is hard copy device 124 which may be used for printing instructions, data, or other information on a medium such as paper, film, or similar types of media. Note, also, that any or all of the components of system 100 and associated hardware may be used in a preferred embodiment, however, it can be appreciated that any type of configuration of the system may be used for various purposes as the user requires.

System 100 may further be coupled to a network interface 125 which provides an interface with a network backbone such as 130. This network 130 may be one of numerous networking systems commercially available, such as the AppleTalk® brand network available from Apple Computer, Inc. of Cupertino, Calif., Ethernet, or Token Ring networks as are generally commercially available. Such a network provides a coupling among many systems and, therefore, system 100 may communicate with a second system such as 150 shown in FIG. 1, such as through the transmission and reception of electronic messages between the systems using well-known electronic mail techniques.

In the preferred embodiment, computer system 100 is one of the Macintosh® family of personal computers such as the Macintosh® Quadra™ or Macintosh® Performa™ brand personal computers manufactured by Apple® Computer, Inc. of Cupertino, Calif. (Apple, Macintosh, Quadra, and Performa are trademarks of Apple Computer, Inc.). Processor 102 is one of the 68000 family of microprocessors, such as the 68030 or 68040 manufactured by Motorola, Inc. of Schaumburg, Ill.

Note that the following discussion of the user interface display methods and apparatus of the preferred embodiment discussed herein will refer specifically to a series of routines which are compiled, linked, and then run as object code in computer system 100 during run-time. It can be appreciated by one skilled in the art, however, that the foregoing methods and apparatus may be implemented in special purpose hardware devices, such as discrete logic devices, large scale integrated circuits (LSI's), application-specific integrated circuits (ASIC's), or other specialized hardware. It can be appreciated by one skilled in the art that the description herein has equal application to other apparatus having similar functions.

User Interface of the Preferred Embodiment

Before discussing the preferred embodiment in detail, a brief overview of the user interface used in this system is required. A "windowing" or graphical user interface (GUI) operating environment is used wherein selections are performed using a cursor control device such as 123 shown in FIG. 1. Typically, an item is "selected" on a computer system display such as 121 using cursor control device 123 by depressing a "selection" button which is typically mounted on or near the cursor control device. In order to launch a user application program, in some circumstances, the user merely selects an area on a computer display represented as an icon by "double clicking" the area on the screen. A "double click" selection is an operation comprising two rapid depressings of the selection device by the user. "Pull-down" or "pop-up" menus are also used in the preferred embodiment. A pull-down or pop-up menu is a selection which is accessible by depressing the selection button when the cursor is pointing at a location on a screen such as a menu bar (typically at the top of the display), and "dragging" (moving cursor control device 123 while the selection button is depressed) until the selection the user wishes to access is reached on the pull-down menu. An item is indicated as being "selected" on a pull-down menu when the item is highlighted or displayed in "reverse video" (white text on a black background). The selection is performed by the user releasing the selection button when the selection he wishes to make is highlighted. Also, in some GUI's, the "selection" and "dragging" of items is provided to move files about in the file system.

Note also that GUI's may incorporate other selection devices, such as a stylus or "pen" which may be interactive with a display. Thus, a user may "select" regions of the GUI on the display by touching the stylus against the display. In this instance, such displays may be touch or light-sensitive to detect where the selection occurs. Such devices may thus detect selection position and the selection as a single operation instead of the "point and click," as in a system incorporating a mouse or trackball. Such a system may also lack a keyboard such as 122 wherein all interface is provided via the stylus as a writing instrument (like a pen) and the written text is interpreted using optical character recognition (OCR) techniques. These types of systems may also benefit from the improved interface described herein.

The Mailer Window

Figure 2:
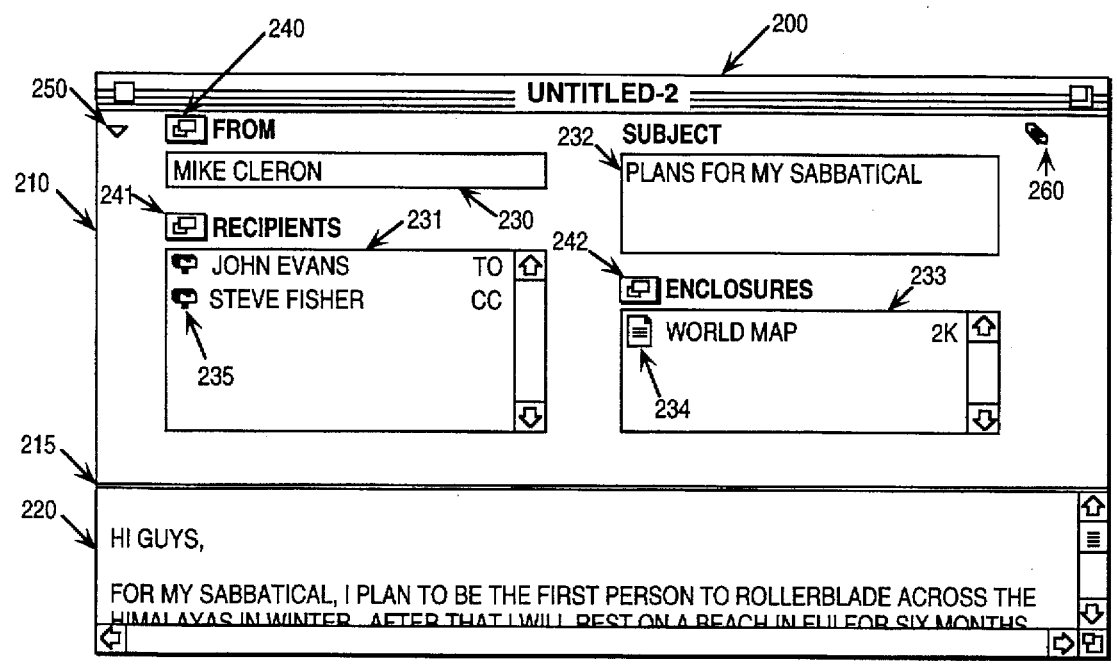
FIG. 2 shows a draft mailer window.

The system of the preferred embodiment implements an improved interface to an electronic mail system, the underlying function of the electronic mail system operating in a manner which may be similar to those commercially available. The improved interface is activated under user control via input on keyboard 122 and various selections using cursor control device 123 shown in FIG. 1. Such actions may be performed on a user interface screen displayed on display 121 such as that shown in FIG. 2. For example, during operation of the mail system of the preferred embodiment, screen 200 of FIG. 2 is displayed on a display such as 121 to allow the user to control various parameters in the electronic mail system. Window 200 of FIG. 2 comprises two portions: (1) a mailer 210 comprising a top portion of window 200 displayed on the display; and (2) an application program data portion 220. Essentially, window 200 and application portion 220 is displayed fully under the control of a user's application program of choice. Mailer portion 210 may be added under user control from within the application program by invoking a series of routines known as the "Standard Mail Package" routines which associates "mailer" portion 210 to the top of an application window on the display and associates a mailer datum with the content (application program data) in the computer system memory and in the computer's file system. Thus, the complete window 200, as shown in FIG. 2, is displayed. By invoking Standard Mailer Package routines, a data structure is created which generates header information which includes the information displayed in portion 210 of window 200. This data structure also comprises a "content" portion which stores the application data displayed in portion 220 of window 200. In this manner, application data and electronic mail information, such as that displayed in portion 210 of window 200, are linked, may be stored, and shown as a single interface display. Mailer 210 is thus closely associated with content 220 of a user application program, and content 220 may be data generated by any window-based application program.

Manipulations of the electronic mail information contained within mailer 210 may be performed by the user under control of cursor control device 123 and keyboard 122. All manipulations and entries into the various fields of mailer 210 are performed using an event preprocessor which detects events directed toward manipulation of the information contained within mailer 210. This is discussed in more detail below. The event preprocessor is inserted into an application program's main event processing loop so that events occurring in region 210 are detected and serviced by the mailer event handling routine, and events occurring in region 220 are handled by the application program's typical event handling routine. In this manner, actions which are directed towards the mailer are intercepted and serviced by mailer-related processes, and those that are not directed towards the mailer or require action by both the mailer processes and the application program are passed for servicing by the application program's event handler. This is also discussed in more detail below.

The appearance of window 200 is structured in such a manner that the user sees an integrated relationship between the native application data contained within region 220 and mailer 210. These two regions are separated by double-line bar 215. In mailer 210, certain information is presented to and allowed to be entered by the user in fields 230-233 regarding the message being sent. 230 comprises the user or other entity from which the mail information is transmitted. Field 231 contains the user name(s) or other entity name(s) to which the message is sent. Field 232 comprises a subject field in which the user may specify a text string for the subject of the mail message. Finally, field 233 is used for specifying any file(s) or directories containing files which are transmitted along with the mail message as enclosures. Associated with each of the directories (known in the Macintosh brand operating system as a folder) or file names listed in field 233 are icons such as 234 indicating the type of data contained within the file(s). As is known to those skilled in the Macintosh programming art, icons typically are stored with files to indicate the types of information contained therein. This icon, such as 234 shown in field 233, indicates the type of data contained therein. Similarly, an icon is associated with all the destination users or entities listed in field 231 indicating the type of entity to which the message is addressed. In the current implementation, an icon such as 235 is associated with each entity, which indicates that it contains an electronic mail box address where the message is sent.

Mailer 210 further comprises an expand/contract toggle 250 which allows the user to reduce the mailer to a condensed size from that shown in 200 of FIG. 2. This may be done in order to reduce the distraction caused by mailer information while the user is working in other areas such as application portion 220 of window 200. A representation of a condensed mailer is shown below in FIG. 4. This toggle, when selected by the user using the selection device, allows the user to switch to either the expanded or contracted state of the mailer depending on its current state. In the example shown in 200 of FIG. 2, if toggle 250 is selected by a user using cursor selection device 234, then the mailer is contracted to a state such as shown in mailer 410 of FIG. 4.

Mailer 210 further comprises "invocation" icons 240, 241, and 242 associated with each of the fields 230, 231, and 233. These each cause a function associated with the field to be executed. For example, icon 240 associated with field 230 allows a user to change the sending entity by registering on the electronic mail system with a new identifying entity name. This process may prompt the user for a user name or entity name and an accompanying password. Such a registration process is well-known in certain prior art electronic mail systems. In addition, an invocation icon 242 may be associated with enclosures field 233. This will cause a selecting interface, known as a "dialog" box in the Macintosh brand operating system, to be displayed in order to allow the user to select files and/or directories to be transmitted with the mail information. Other techniques may also be used to enter data into this field. These directories or files later appear listed in field 233. Such file menus or dialog boxes are also well-known in prior art GUI's, such as the Macintosh brand operating system. Invocation icons such as these, however, are closely associated with fields to provide for improved user feedback and function, as in the representation shown in FIG. 2.

Further, recipients field 231, which specifies which entities will receive the mail message, has an invocation icon 241 associated with it. Similar to the enclosures invocation icon 242, entities or other items may be brought up on a pull-down menu or dialog-type box, as is well-known in the prior art Macintosh brand operating system. However, icon 241 causes the activation of a process which allows the user to specify a destination entity in a variety of different ways which are each integrated with the other. This will be discussed in more detail below with reference to FIGS. 6-9.

Yet another feature of draft mailer 210 is paper clip icon 260 which appears when an "enclosure" has been added into field 233 and, thus, is associated with and can be retrieved from the message. Paper clip icon 260 indicates that enclosures are present in the mailer and may be downloaded into the recipient's mass storage device (e.g., 107 of FIG. 1) or other storage device. This icon is especially useful when mailer 200 is in a collapsed state (e.g., 400 of FIG. 4; see discussion below).

Reply mailers look similar to that shown as 200 in region 210, however, subject field 232 has the term "Re:" followed by the subject listed in field 232. In a reply mailer, a new content field 220 is allowed to be updated by the user. Thus, a new content portion 220 is created and allowed to be entered by the user. The source of the original message also becomes the recipient of the reply mailer and the recipient of the source. The application may also be flagged to allow the original content to be copied into the content field 220 of the reply letter.

Figure 3:
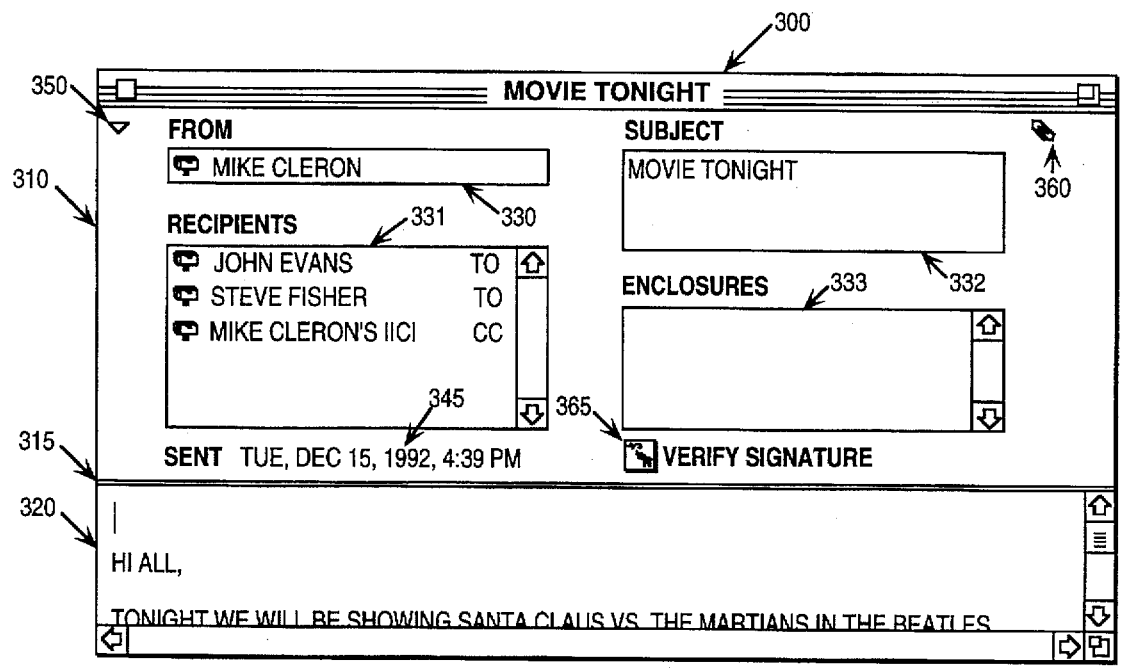
FIG. 3 shows a received mailer window.

An example of a received mailer is shown as window 300 in FIG. 3. Note that the received mailer is virtually identical to the draft mailer, however, it lacks the invocation icons 240-242 and contains information 345 regarding when the message was sent. The received mailer 310 also comprises an icon 365 which will invoke a process in the user's computer system to verify the source of the received message. Such a verification process is known as a "digital signature" and is a well-known technique developed by and available from RSA Data Security, Inc. of Belmont, Calif. In this manner, the user may verify the origin of the message (that it came from the entity listed in field 330) simply by selecting icon 365 and verify that content 320 has not been altered since the sender "signed" message 365. This is an optional feature which is present only if the sender used the digital signature feature and will not be displayed otherwise.

Figure 4:
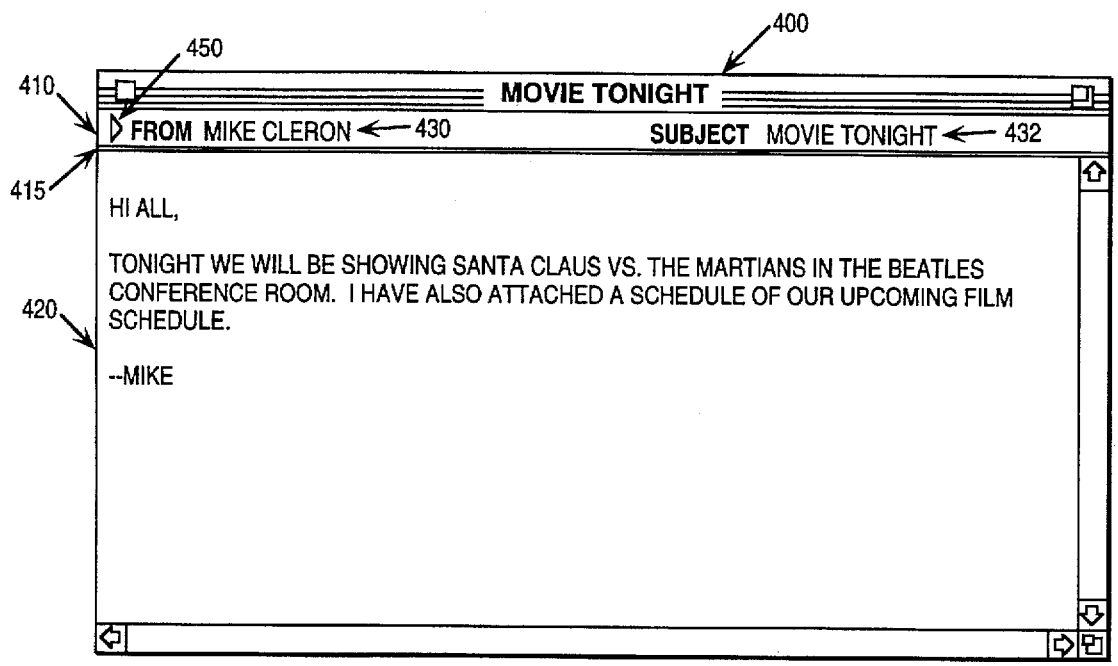
FIG. 4 shows a "collapsed" received mailer.

A condensed view of a window 400 containing a mailer is shown in FIG. 4. Window 400 comprises two portions: Mailer 410 and application content 420. Only a limited amount of information is shown in mailer 410. In addition, expansion/compression toggle 450 is shown in a different orientation which indicates that the condensed mailer 410 is being viewed. When the user selects the toggle, depending on the current state of the mailer, the toggle is animated and apparently rotates to the new orientation as shown in FIG. 2. Moreover, the mailer itself is animated such that a mailer such as 210 or 310 shown in FIGS. 2 and 3 is animated during the compression/expansion to provide feedback to the user, using well-known prior art animation techniques. Compressed mailer 410 comprises a "From" field 430 and a "Subject" field 432 only which provides limited information to the viewer of window 400. Mailer 410 provides limited information so that the user will not be distracted by the mail information when working in content portion 420 shown in window 400 while the mailer is in the condensed state. When in the state shown in FIG. 4, expansion/contraction toggle 450 may be selected in order to expand the mailer to its full dimensions and, thus, view the full information contained in the mailer (e.g., 210 in FIG. 2). The preferred embodiment also provides a feature wherein mailer 410, and associated information may be removed from the application content 420 altogether.

Figure 5:
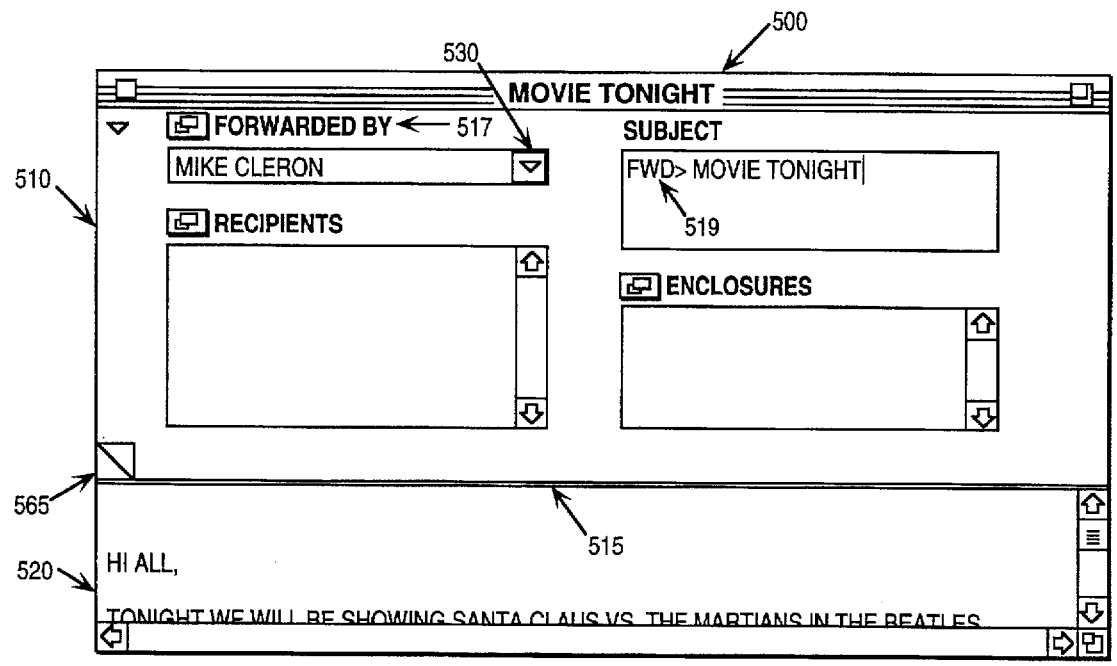
FIG. 5 shows a forwarded mailer with a draft forwarded mailer displayed on top.

FIG. 5 shows an example of a "forwarded" mailer. As is well-known to those familiar with prior art electronic mail systems, electronic mail messages may be "forwarded" in a similar manner to a letter being forwarded from one mailbox to another in the post office mail system. A forwarded mailer nests the previous mailer and associated application data within the data structure representing the mailer and the application program content. For user interface purposes, the message in the application content field of the previous mailer is maintained the same in a region such as 520 shown in FIG. 5. Additional feedback is provided to the user, however, to show that it is, indeed, a forwarded mailer. For example, "turned-up corner" icon 565 indicates that another mailer is nested or available from within this window. If the user selects button 565, then the previous or original mailer which was forwarded can be accessed. Any number of mailers may be nested in this manner to form a forwarding chain and accessed by the recipient by selecting this icon. The "from" field is now referred to as the "forwarded by" field. Also, the subject field now includes the tag "Fwd," as is shown by 519. Additionally, icon 530, shown in FIG. 5, appears as a means of examining the forwarding history of the letter. When the user selects forward icon 530, a menu appears showing all previous recipients of this letter in reverse chronological order. The user can select any of these recipients to access the mailer associated with that recipient. This allows the access of any of the "nested" mailers in the forwarding chain.

Automatic Entity Selection Mechanism

The preferred embodiment also uses an automatic and integrated entity selection interface. In various electronic mail applications, different means of addressing entities, such as other users, to receive messages are provided. A single window "addressing panel" is used in the preferred embodiment for specifying four different types of addressing modes. The underlying functions controlled by the four addressing panels use techniques similar to those known in the prior art, and the integrated interface mechanism may be used for other types of operations, such as specifying files arranged in a hierarchical file system (HFS). There are numerous advantages to this addressing mechanism which are not discussed in more detail here but which are apparent. It can be appreciated by one skilled in the art that the integrated selection mechanism provided by the preferred embodiment may be used for other applications and provides inventive advantages over other prior techniques of specifying objects in a computer system.

Note also that for the remainder of this discussion of the automatic entity selection mechanism, certain types of items are shown and displayed in FIGS. 6–9. These entities represent users on a computer system to whom that electronic mail may be addressed and transmitted. Note that these particular types of entities are available from within the computer system by examining an entity type field stored with each file. In some instances, electronic mail addresses may be used, but in other instances, entities may be of other types (e.g., conference rooms in which a meeting is to take place) or other types of entities which are defined in the computer system. Typically, such different entities have distinct icons associated with them, such as the "user" icons illustrated with reference to FIGS. 6, 7, and 9. The entity type is specified in the preferred embodiment by the underlying application program in the call to the automatic entity selection mechanism. The entity type acts as a filter, displaying only those pertinent within the given context. Thus, the entity type is passed as a parameter in the call to the automatic selection mechanism to specify the types of entities displayed in the various automatic selecting panels in FIGS. 6, 7, and 9 for the particular context.

Figure 6:
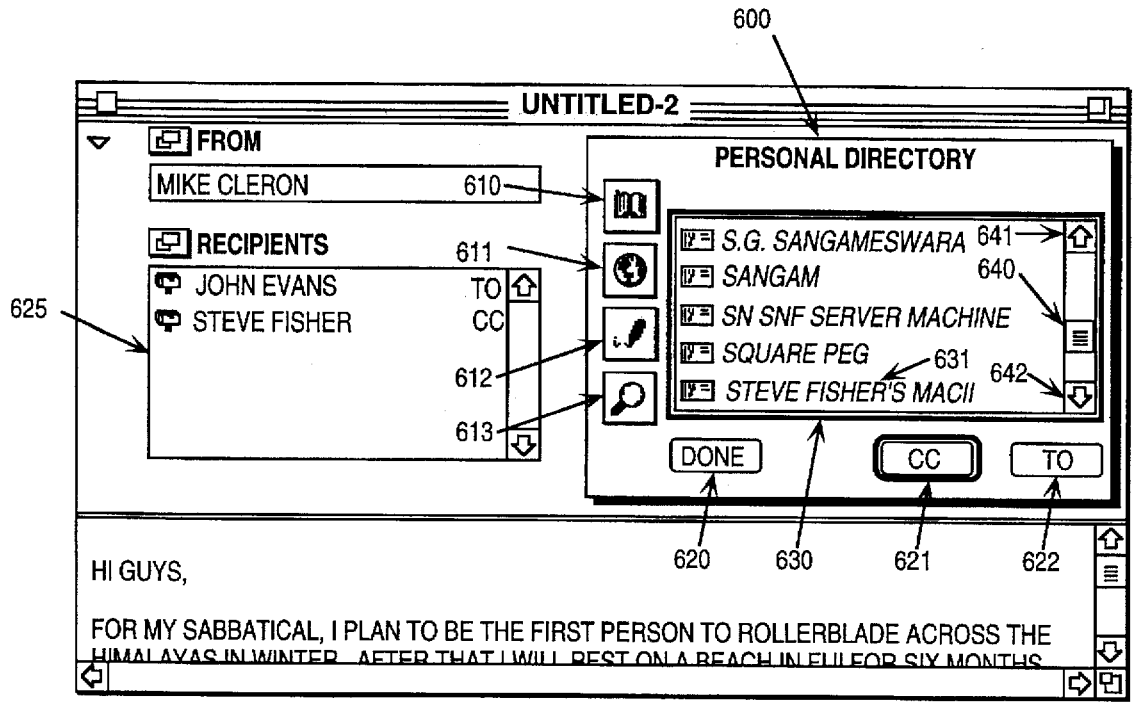
FIGS. 6–9 show the four different appearances of the automatic selection interface which is activated from a draft mailer window.
Figure 7:
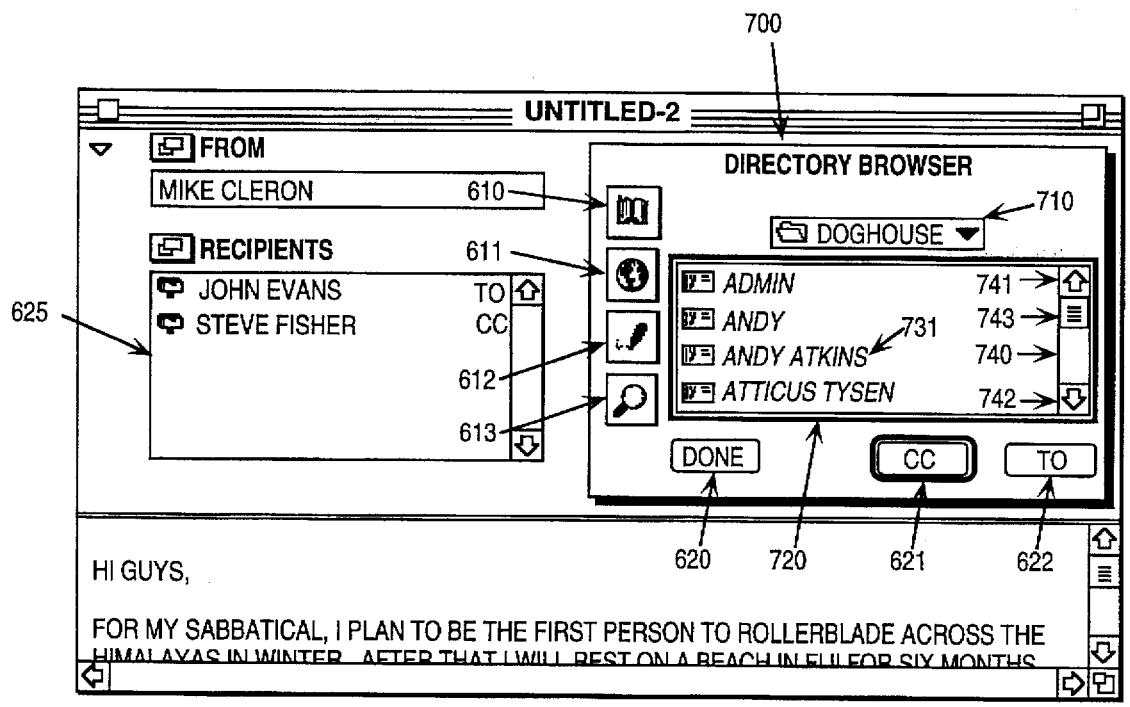
Figure 8:
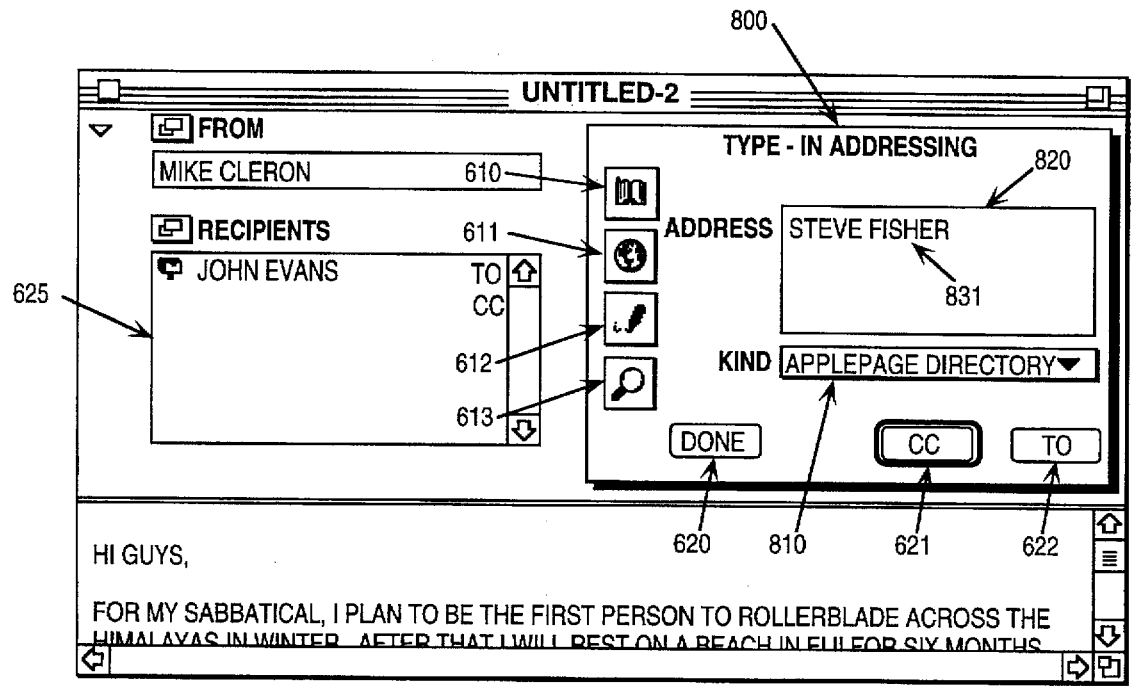
Figure 9:
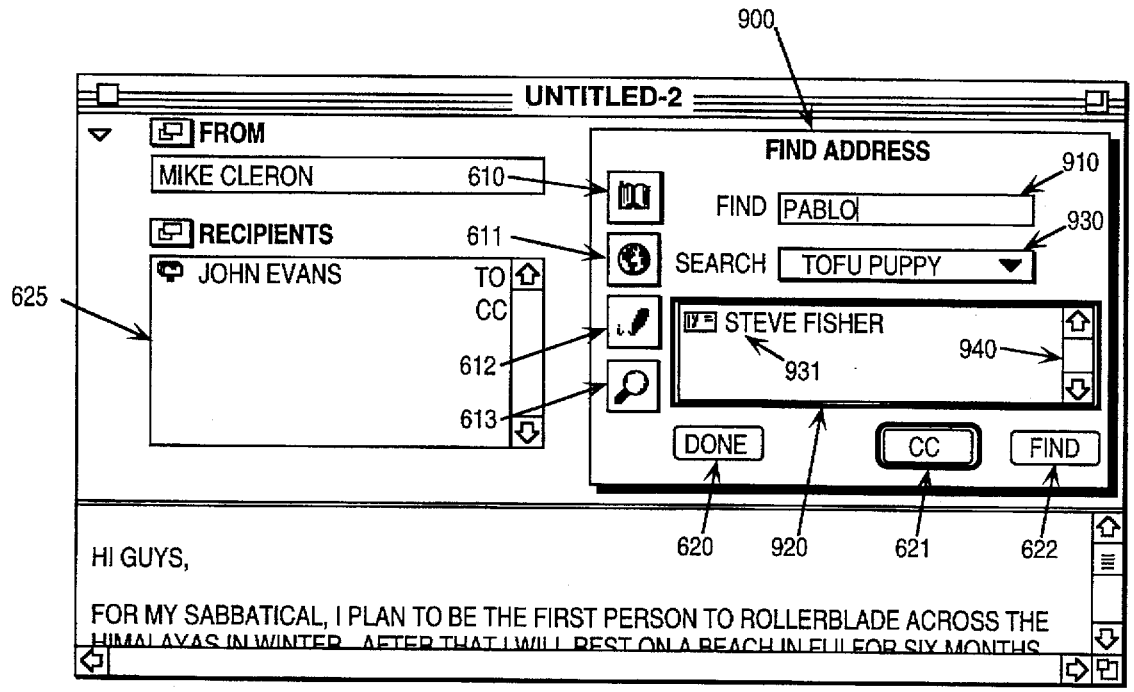

When creating a draft mailer such as 210 shown in FIG. 2, the automatic entity selection mechanism may be invoked by selecting the invocation icon 241 shown in FIG. 2. This causes one of four addressing panels shown as 600–900 in FIGS. 6–9 to be displayed. After a panel from one of FIGS. 6–9 has been displayed, then any of the other panels in the remaining figures may be accessed by selecting an appropriate icon on the displayed addressing panel. For example, if a user selected icon 241 on display window 200 of FIG. 2, in a preferred embodiment, then the "personal directory" display panel 600 may be displayed. For example, this may be the default addressing panel, or the last addressing panel which the user used to address a mailer. In either case, from within addressing panel 600, any of the other panels 700, 800, or 900 shown in FIGS. 7–9 may be accessed. This is done by selecting one of the appropriate icons 610, 611, 612, or 613, as is shown in FIG. 6. Icon 610 is currently shown in its "selected" state, and thus the "Personal Directory" addressing panel 600 is currently displayed. If the user selects 611, then addressing panel 700 of FIG. 7 is displayed. This is shown in FIG. 7. If icon 612 is selected, then 800 of FIG. 8 is displayed, or if 613 is selected, then 900 of FIG. 9 is displayed.

While the user is in an addressing panel, certain options may be selected for addressing entities which will receive the mailer. There are three modes of addressing entities: "To," "CC," and "BCC." These are activated exclusive of the others by icons 621 or 622. A "BCC" addressee is available at the position of "CC" icon 621 when the user selects the "option" key on keyboard 122. The icon remains in its "selected" state during the time in which the addressing panel is displayed. If the user selects an icon such as 622 shown in FIG. 6 (as is the current shown by the highlighted state of button 622), then any selected entity addresses in the addressing panel are put into the recipients field (e.g., 625), specifying that the entity is a "To" recipient of the message. If icon 621 is selected, then the selected address is a "CC" (a "courtesy copy" or "carbon copy"). "BCC" is used for addressing entities that the sender wishes the other recipients not be aware of. This is known as a "blind courtesy copy," and the mailer system deletes these entity names from the "to" field on other recipients' displays. When the user has completed entering all of the entity names in recipients field 625, then he selects icon 620 which exits the addressing panel and returns to the normal draft mailer display. For the duration of the addressing panel session, selected addresses are stored in a data structure associated with the mailer and the message for use during the message-sending operation by the mail system. The user may also add the selected entity to his personal directory (a local directory of entity addresses) by selecting a "PD" button which is displayed at the position of "To" button 622 when the "option" key has been selected.

"Personal Directory" addressing panel 600 is shown in FIG. 6. This is shown by the selected icon 610 on addressing panel 600. This particular panel displays a list of entity addresses in a window such as 630 which the user may select for sending the mailer to. For instance, he may select a single entity name such as 631 shown in addressing panel 630 which then gets placed into field 625. Again, this address will be considered a "To" addressee because icon 622 has been selected. If the personal directory requires more space than is provided by window 630, then the user may scroll through the list using scroll bar 640 or using either up or down arrows 641 or 642 to scroll to the appropriate place in the personal directory list where the address appears. The "personal directory" mode is one which a user may maintain a list of user-specific entity addresses, such as frequently used addresses, for ease of retrieval by the user. These addresses may be stored in a local mass storage device, such as 107, coupled to the user's system 100 in contrast to other addressing modes which may require storage on servers to be accessed.

Note that, although addressing modes may be provided in various prior art systems, such as Microsoft Mail and/or the QuickMail brand systems, these prior art systems do not provide the integrated display and control mechanism as is described here. For the simplicity of description, these entity addressing techniques will be treated in this application as locating files in a hierarchical filing system, for example, although the actual underlying mechanism for addressing entities differs somewhat. Thus, personal directory 600 may be viewed as a "default" or local directory in which a list of files (entities) for the user are stored and maintained. In this case, file names are analogous to the entity addresses as would be provided in a typical electronic mail environment.

In FIG. 7, the "Directory Browser" addressing panel 700 is shown. The directory browser panel 700 is activated by selecting icon 611 which is shown in its selected state in FIG. 7. 700 allows the user to scan manually or "browse" through various levels or "directories" of entity addresses which may be accessed in a similar manner to file names in a hierarchical filing system. For example, by selecting area 710, a pull-down menu may be activated wherein various directories may be accessed. In this manner, parent "directories" of entity names may be accessed. Then, depending on the directory being displayed in region 710, a list of all the entity addresses contained in the directory is displayed in a region 720 of addressing panel 700. The user may scroll through the addresses if the number of entity names exceeds that able to be displayed in region 720, by using the scroll bar 740 by either selecting the up or down arrows 741 or 742 to scroll up or down, or using the slider gadget 743 to scan to a desired entry in the entity list. Once this has been done, a user name such as 731 may be selected in the window, and that address placed into recipients field 625. Thus, various entity addresses may be accessed using "directory browser" 700.

Another addressing panel supported by the automatic addressing mechanism is "Type-In" addressing panel 800 shown in FIG. 8. This is activated when icon 612 is selected. Panel 800 allows the user to manually specify or type in entity addresses. The user may specify, using pop-up menu 810 the kind of address that the user is entering. The types of addresses supported is not directly pertinent to the present invention, however, it is anticipated that a variety of address types may be supported and specified in field 810 (e.g., Internet, AppleLink, or facsimile addresses). Once the address type has been established or the default is used, the user may select region 820 using the cursor control device and manually enter an entity address (e.g., an Internet address) such as 831 shown in 800. Then, the specified entity is copied to region 625 and associated with the mailer for use during message transmission.

The fourth addressing panel support by the integrated addressing mechanism is shown as 900 in FIG. 9. This panel is activated when the user selects icon 613 of the addressing panel. 900 allows the user to specify directories in which the entity addresses may be found and cause a search routine to be executed in the underlying mail system for the entity address(es). This is analogous, in the file system example, to specifying directories where file names will be searched for. Field 930 contains the locality where entity addresses will be searched for. Like field 710 shown in FIG. 7, this field may be selected by the user and various directories scrolled through using a pop-up menu item. Field 910 may also be selected by the user to specify those strings which the user seeks a match in order to specify entity names or file names to search for. Once the search locality has been specified in 930 and the search string has been specified in field 910, all the matches with that string in that locality are displayed in window 920. In example panel 900 shown in FIG. 9, the user has requested that the string "Pablo" in the locality "Tofu Puppy" displayed in 930 be searched for. 920 will show the results of the search. The user may then specify which of those addresses with the entity names appearing in list 920 to be specified in the "recipients" list 625 of the mailer. For instance, address 931 may be selected using the cursor control device and placed into the mailer. Once all desired addresses have been completely specified, "Done" button 620 is selected, and addressing panel 900 disappears. The mailer is then redisplayed with the updated address information in field 625.

The integrated addressing mechanism provided by invocation icon 241 on mailer 210 of FIG. 2 and the corresponding automatic addressing panels 600–900 of FIGS. 6–9 provides distinct advantages, over prior art. Prior art systems have lacked a single fully integrated entity addressing or file selection panel such as those shown in FIGS. 6–9. Also, some system have lacked any or all of these selection mechanism features. The presentation of that information on a display such as 121 shown in FIG. 1, in the manner shown in FIGS. 6–9, provides distinct advantages, such as the grouping of the controls to make addressing more efficient, a more intuitive interface and superior control of the underlying addressing mechanism. Other advantages may become apparent to one skilled in the art upon viewing FIGS. 6–9.

Application Program Event Processing

In order to integrate mail information with application program data, the preferred embodiment uses an event preprocessor inserted into the main event handling loop of the application program so that events intended for the mailer are processed and handled by a mailer-specific process, and those requiring action by the application program are handled in the normal manner by the application program event handler with the mailer process determining whether it or the application program needs to handle each event. This process is graphically shown in the flowchart in FIGS. 10a and 10b. Process 1000 illustrates a modified executive or event processing loop of a user's application program which responds to events such as user selections or input from a keyboard. At step 1001, as is typical in event handlers, the next event from the event queue is retrieved. At step 1003 in event loop 1000, a call to the mailer event preprocessor SMPMailerEvent( ) is made which intercepts events directed towards the mailer. Subsequent to the execution of SMPMailerEvent( ), it is determined at step 1005, by testing various flags returned from SMPMailerEvent( ), whether the application program's event handler also be executed. This is done by testing flags returned from event preprocessor 1003, such as kSMPAppShouldIgnoreEvent, which specifies that the application event handler should not be executed. The flag kSMPAppMustHandleEvent is returned from the event preprocessor if the application event handler should be executed. Event preprocessor 1003 determines whether an event such as a selection, or other action, pertains to the mailer, such as 210 shown in FIG. 2. Events for the mailer are determined by detecting the cursor position relative to the window where the event occurred and/or considering the current state of the system given prior events, as understood by those familiar with programming in the Macintosh brand GUI. If the event occurred outside mailer window 210 or it was otherwise an event also requiring action by the application event handler, then this condition is detected at step 1005, and the application program's normal event handler normally processes the event at step 1007. If not, then process 1000 returns to step 1001 to retrieve and service the next event.

Figure 10A:
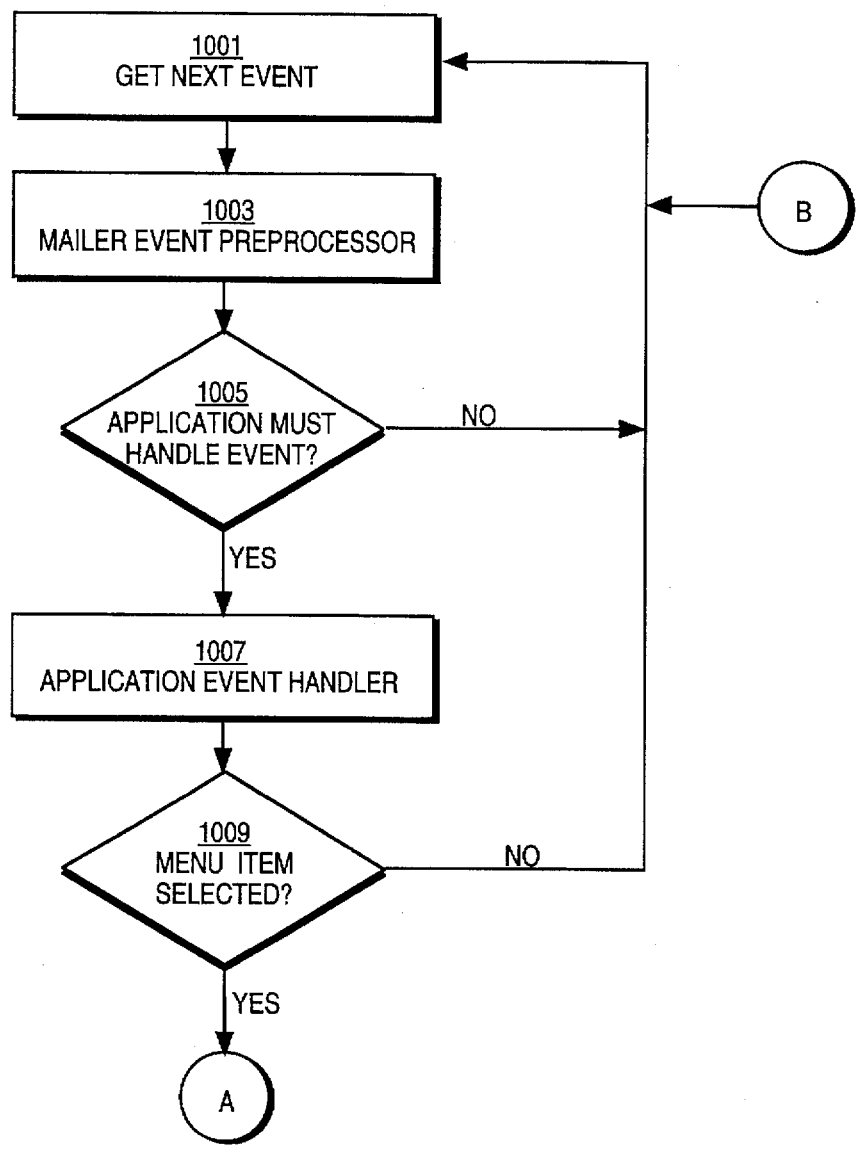
FIGS. 10a and 10b is a process flow diagram of an event or executive loop of an application program which has incorporated the mailer event preprocessor used by the preferred embodiment.
Figure 10B:
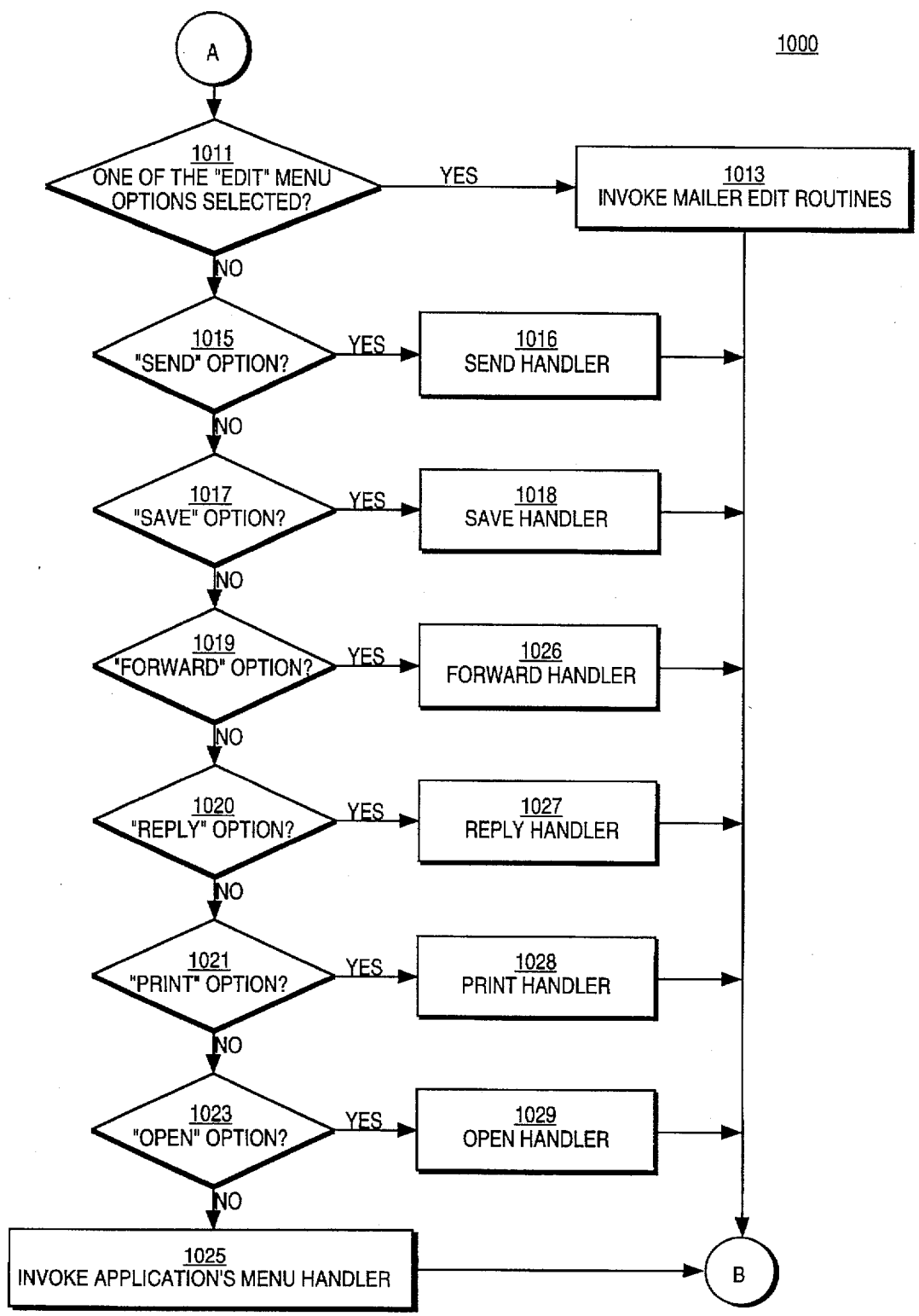

Once the application event handler has been executed at step 1007, then it is determined at step 1009 whether a menu item on the menu bar of the display window (not shown in the figures) has been selected. If not, process 1000 proceeds back to step 1001 to service the next event in the event queue. If a menu item has been selected, however, then process 1000 proceeds to step 1011 and subsequent steps, as is shown in FIG. 10b. Step 1011 of FIG. 10b determines whether one of the edit menu options has been selected. These include, but are not limited to, the "cut," the "copy," the "paste," the "clear," and the "select all" options, as standard in the Macintosh GUI. If any of these edit menu options has been selected, as determined at step 1011, then the mailer editing routines are invoked at step 1013. These are discussed in more detail with reference to FIGS. 11a and 11b.

Figure 13A:
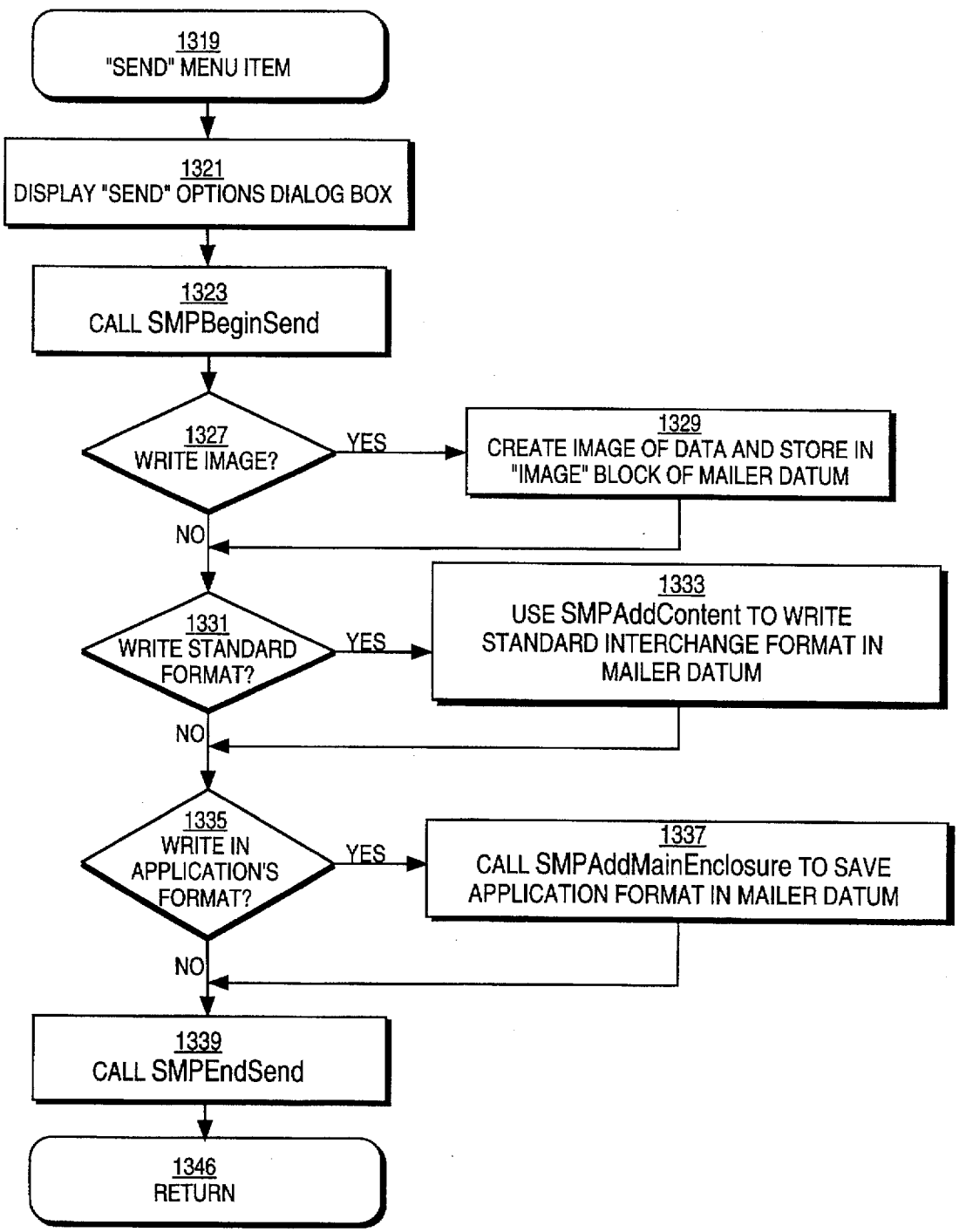
FIG. 13a–25b are more detailed views of the processes discussed with reference to FIGS. 10a through 12.
Figure 15:
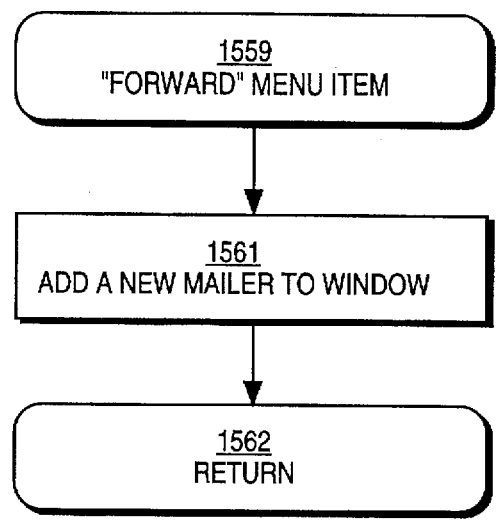
Figure 16:
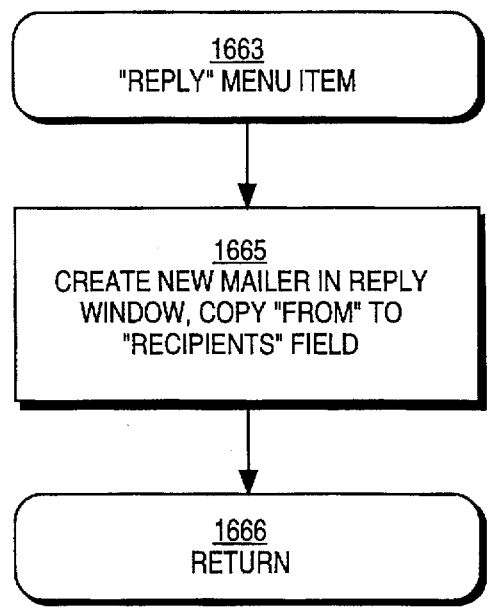
Figure 17:
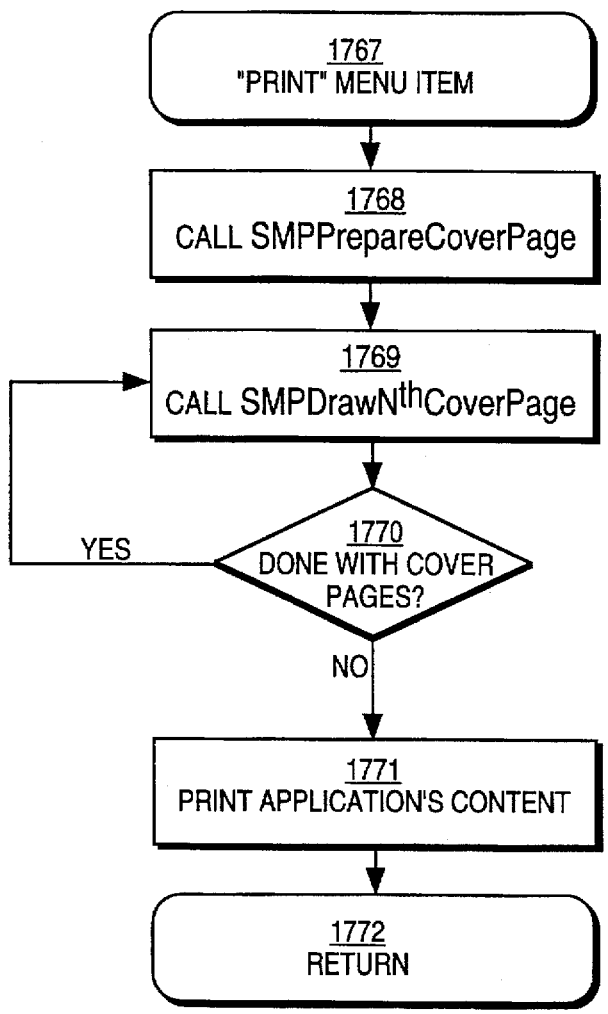

If none of the "edit" menu options has been selected, however, as determined at step 1011, then certain other menu options available on the menu bar selected by the user may be detected and serviced. For example, it is determined at step 1015 whether the "send" option on the menu bar has been selected for sending the mailer and the associated message contained in the application portion of the window. This is described in more detail with reference to process 1016 of FIG. 13a. If the "send" option has not been selected, then it is determined at step 1017 whether the "save" option has been selected from the pull-down menu. If so, then process 1018 is invoked, which is discussed in more detail with reference to FIG. 14. If the "save" option has not been selected, then it is determined whether the "forward" option has been selected from the pull-down menu at step 1019. If so, then forward mail handler 1026 shown in FIG. 15 is invoked. If the "forward" option has not been selected, then it is determined whether the "reply" menu option has been selected at step 1020. If so, then reply routine 1027 of FIG. 16 is executed. If not, then it is determined whether the "print" option of the menu has been selected at step 1021. If so, then process 1028 of FIG. 17 is invoked. In not, then the "open" menu option is checked for at step 1023. If so, then process 1029 of FIG. 18 if invoked.

Figure 11A:
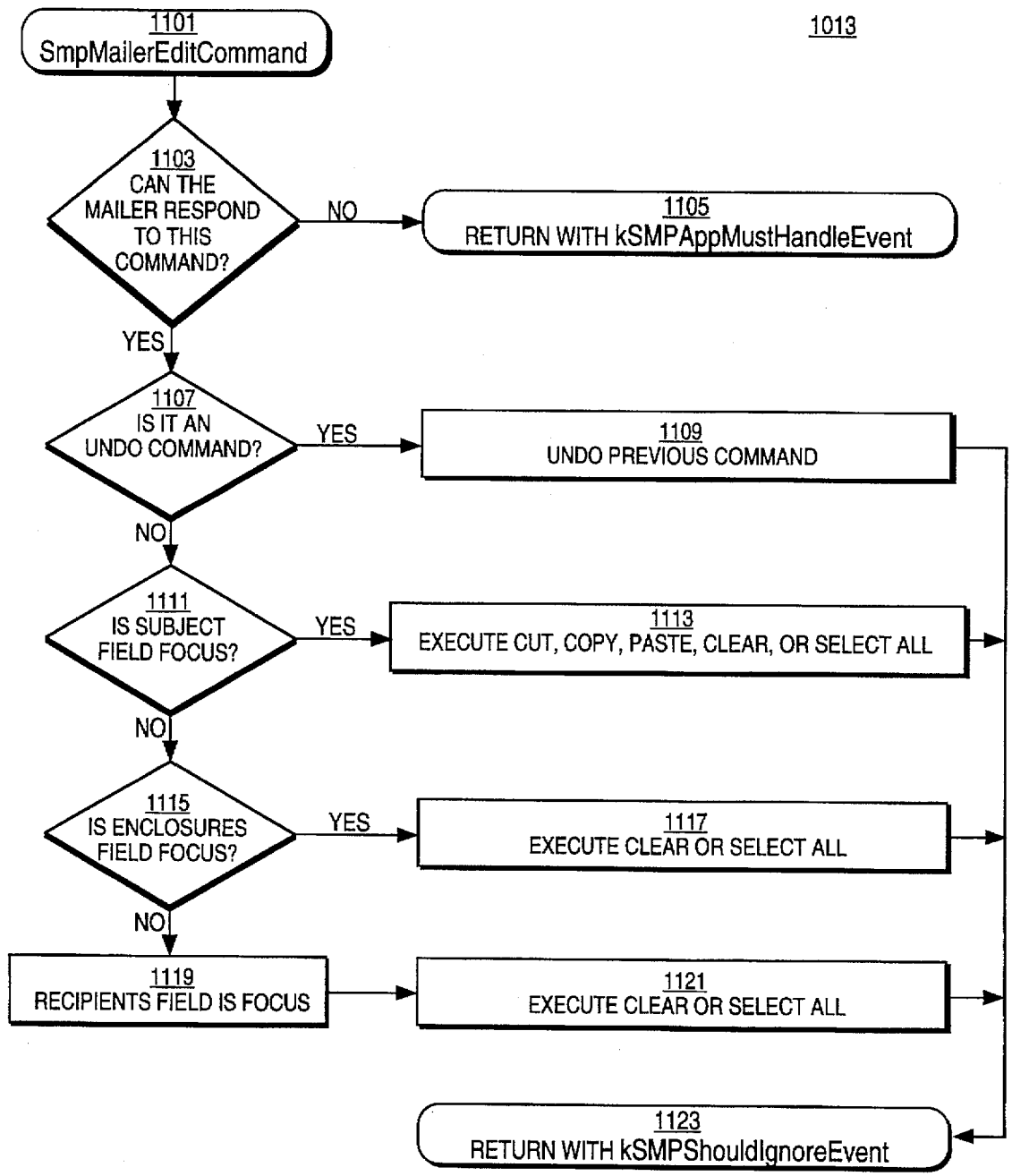
FIGS. 11a and 11b show a process for servicing various edit commands from pull-down menu options while displaying the mailer window.
Figure 11B:
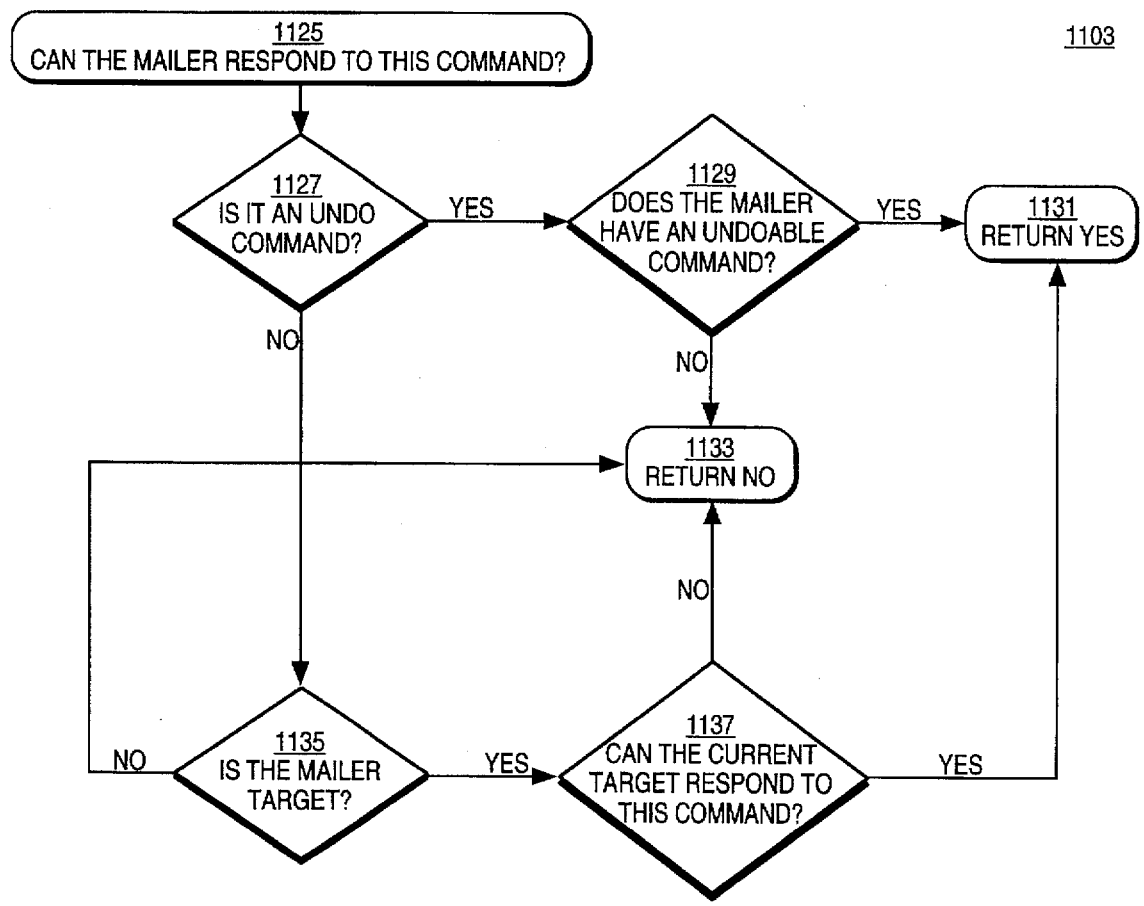

Various edit commands which are serviced during the display of the mailer window are shown in FIGS. 11a and 11b. The process entry point is shown as 1101 in FIG. 11a, and it is determined at step 1103 whether the mailer can respond to the command. In other words, there are certain menu options which the mailer will not service. This process is shown in detail in FIG. 11b. If the mailer cannot respond to the issued edit command, then, at step 1105, the edit menu handler returns to the main event loop. If, however, it is a command that the mailer can respond to and it is an "undo" command, as detected at step 1107, then the previous command is reversed at step 1109, that is, the mailer is placed back into the state it was prior to the previous command. This is done in a manner well-known to those skilled in the art. Then, at step 1123, the process returns with kSMPAppShouldIgnoreEvent to indicate that the application should not service the event. If it was not an "undo" command, then it is determined at step 1111 whether the "subject" field (e.g., 232 of FIG. 2) is the focus of the particular edit command. If so, then any of the edit command options: "cut"; "copy"; "paste"; "clear"; or "select all" is performed at step 1113. Then, the process returns at step 1123. If, however, it was the "enclosures" field (e.g., 233 of FIG. 2) which was the focus of the edit command at step 1115, then the "clear" or "select all" edit options are allowed to be performed at step 1117. Any of the other edit options are not allowed to be performed for the enclosures field, and thus, no action is performed in those cases. The process then returns at step 1123. If the enclosures field was not the focus, it is assumed that the "recipients" field is the focus at step 1119, and, if so, then the clear or select all are also allowed to be performed at step 1121. Like the enclosures field, other options are not allowed to be performed at step 1121, and the process returns at step 1123 with the flag set indicating that the application should not handle the event.

A more detailed flow diagram for determining whether the mailer can respond to the command is set forth in FIG. 11b. The process entry point is shown as 1125, and it is determined whether it is a "undo" command at step 1127. That is, the user wishes to restore the mailer to the state it was in prior to the performance of the last command. If so, then it is determined at step 1129 whether the mailer has an undoable command, that is, can the mailer be put back into the state it was prior to the performance of the last command. Certain commands may not be able to be undone. If it is an undoable command, then a return is performed from the routine at step 1131 with the process returning the condition Yes set indicating that the mailer can respond to the command. If not, then the process returns at step 1133 with the condition No indicating that the mailer cannot respond to the command, and thus, process 1013 returns at step 1105. If it is not an "undo" command, as determined at step 1127, then it is determined at step 1135 whether the mailer is the target. If not, then the process returns with the condition No at step 1135 indicating that the edit command was, perhaps, for another item in the application's content field. If the mailer is the target and the mailer can respond to the command, as detected at step 1137, then the process returns with the condition Yes set, and process 1013 continues normally. If not, then the process returns at step 1133 with the condition No set, and process 1013 returns to the main event loop at step 1105.

The remaining menu options discussed with reference to FIGS. 10a–10b and the accompanying routines performing the associated actions in the menu options will be discussed in more detail below. If none of those menu options has been selected, then it is assumed that the menu option selected by the user is not one of the mailer options and that it must be handled by the application program's menu handler. Thus, if none of the above-described options have been selected, as determined at step 1023, then the application program's menu handler is invoked at step 1025. Process 1000 of FIG. 10b returns to step 1001 of the application event processing loop on FIG. 10a after any of the menu options events have been serviced.

Mailer Event Preprocessor

Figure 12:
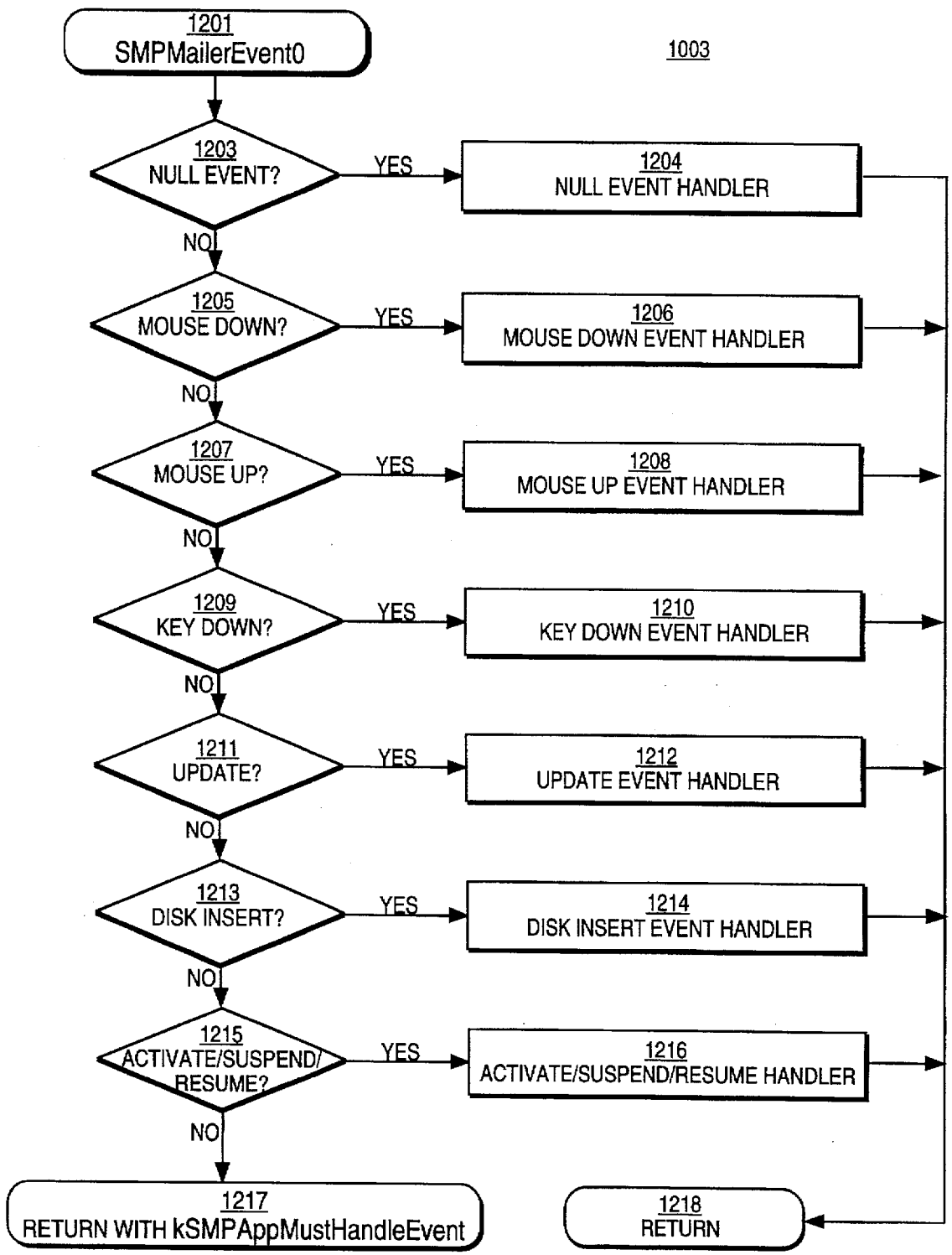
FIG. 12 is a process flow diagram of an event preprocessor.
Figure 19:
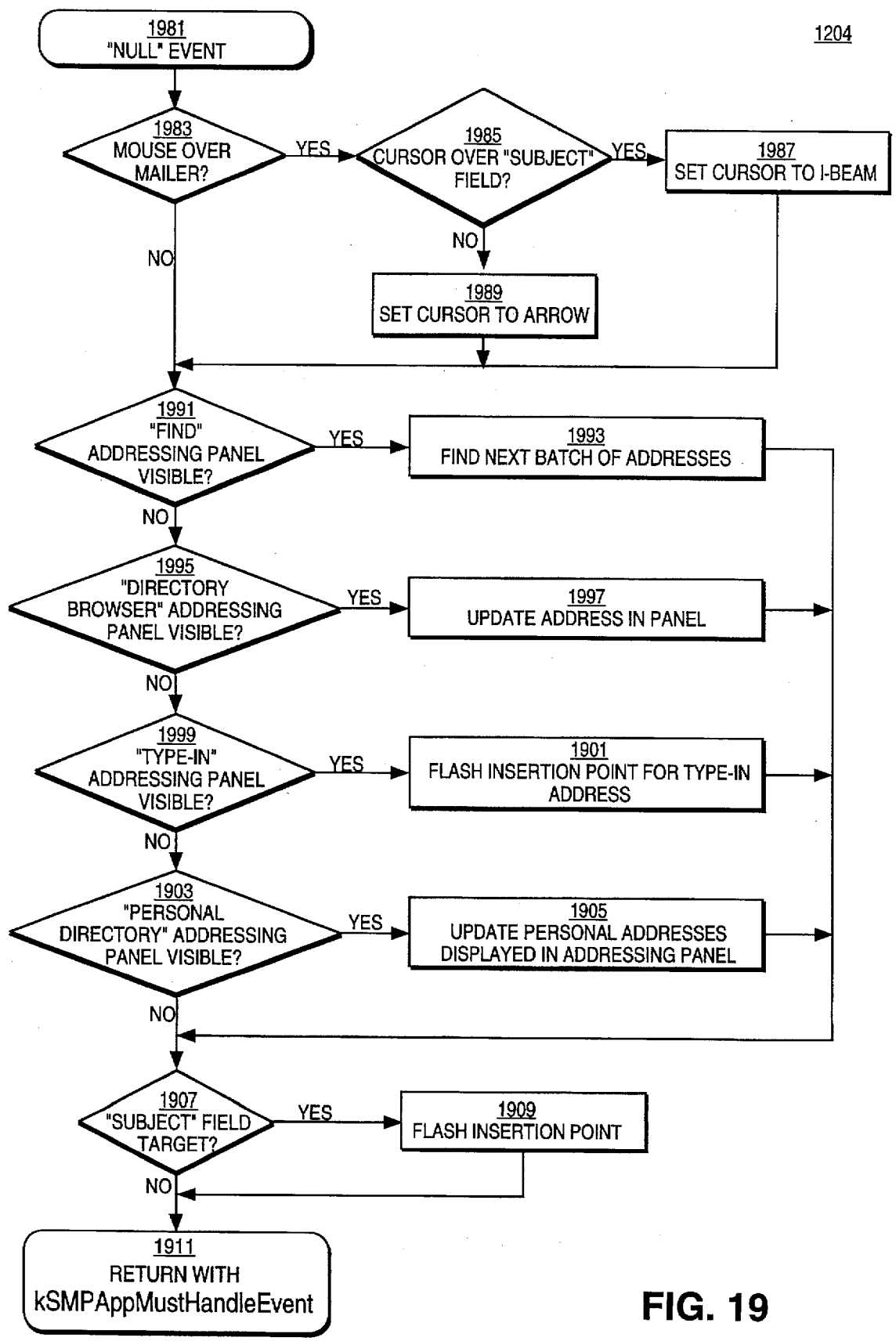
Figure 22:
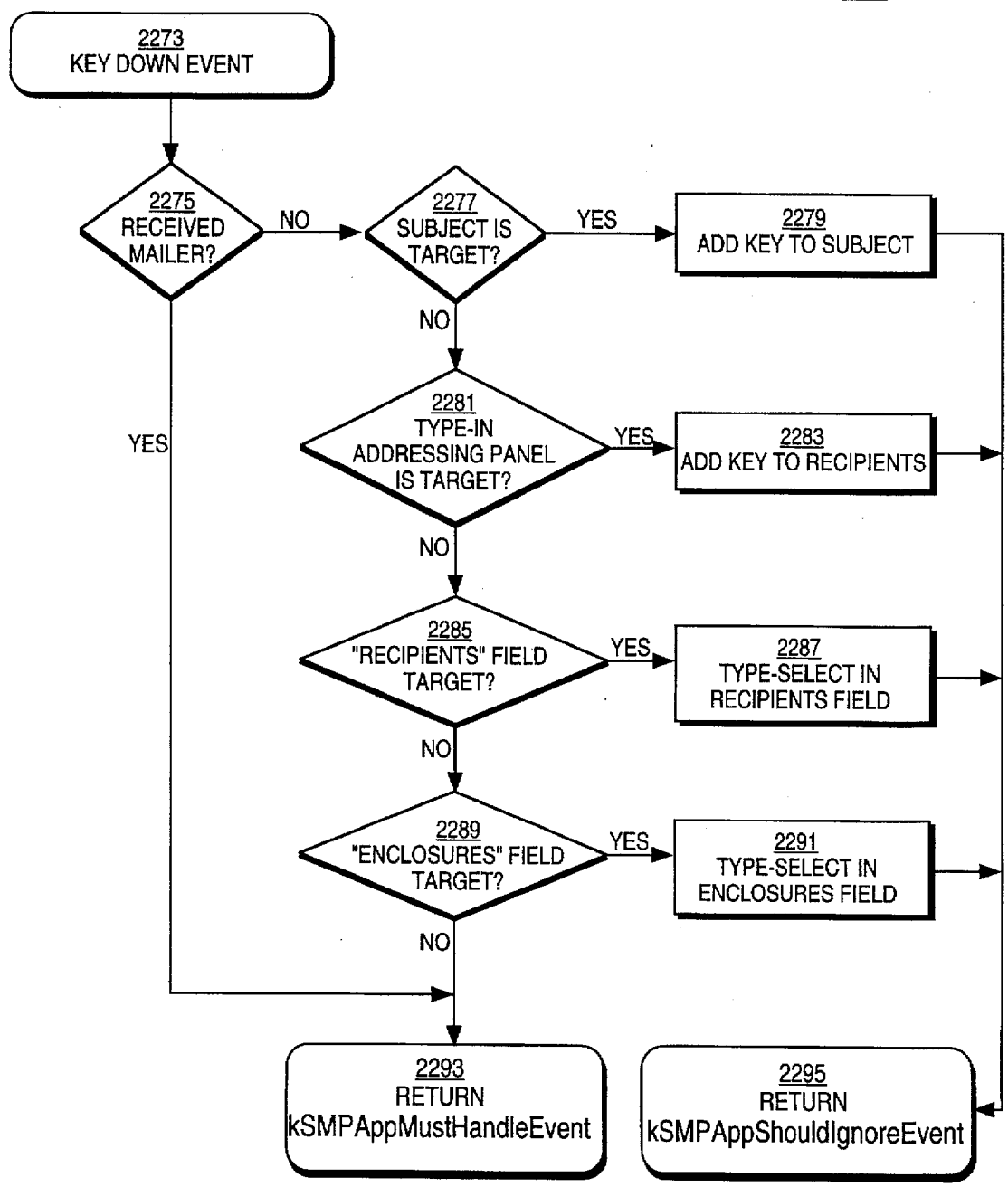
Figure 23:
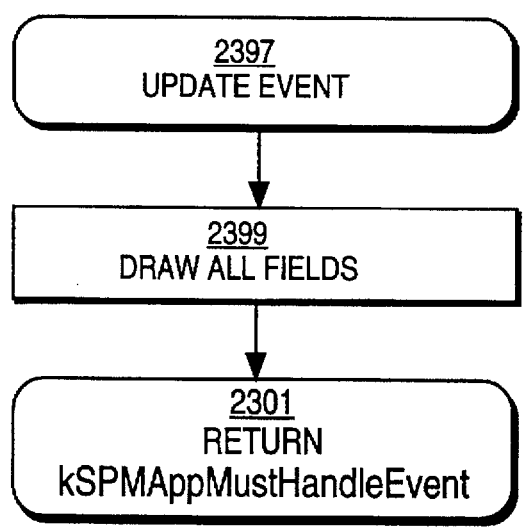
Figure 24:
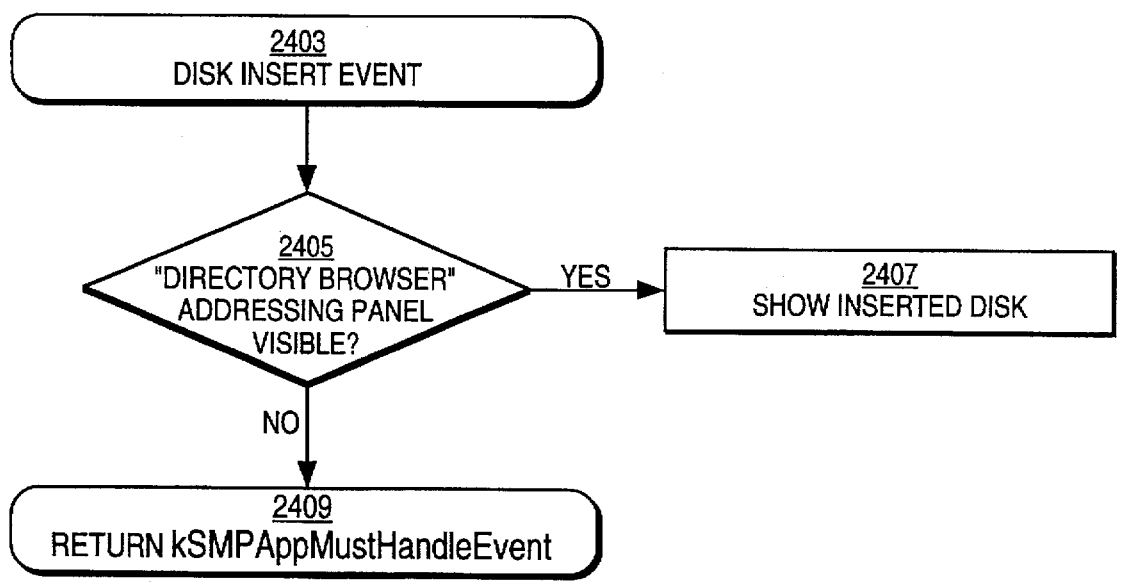
Figure 25A:
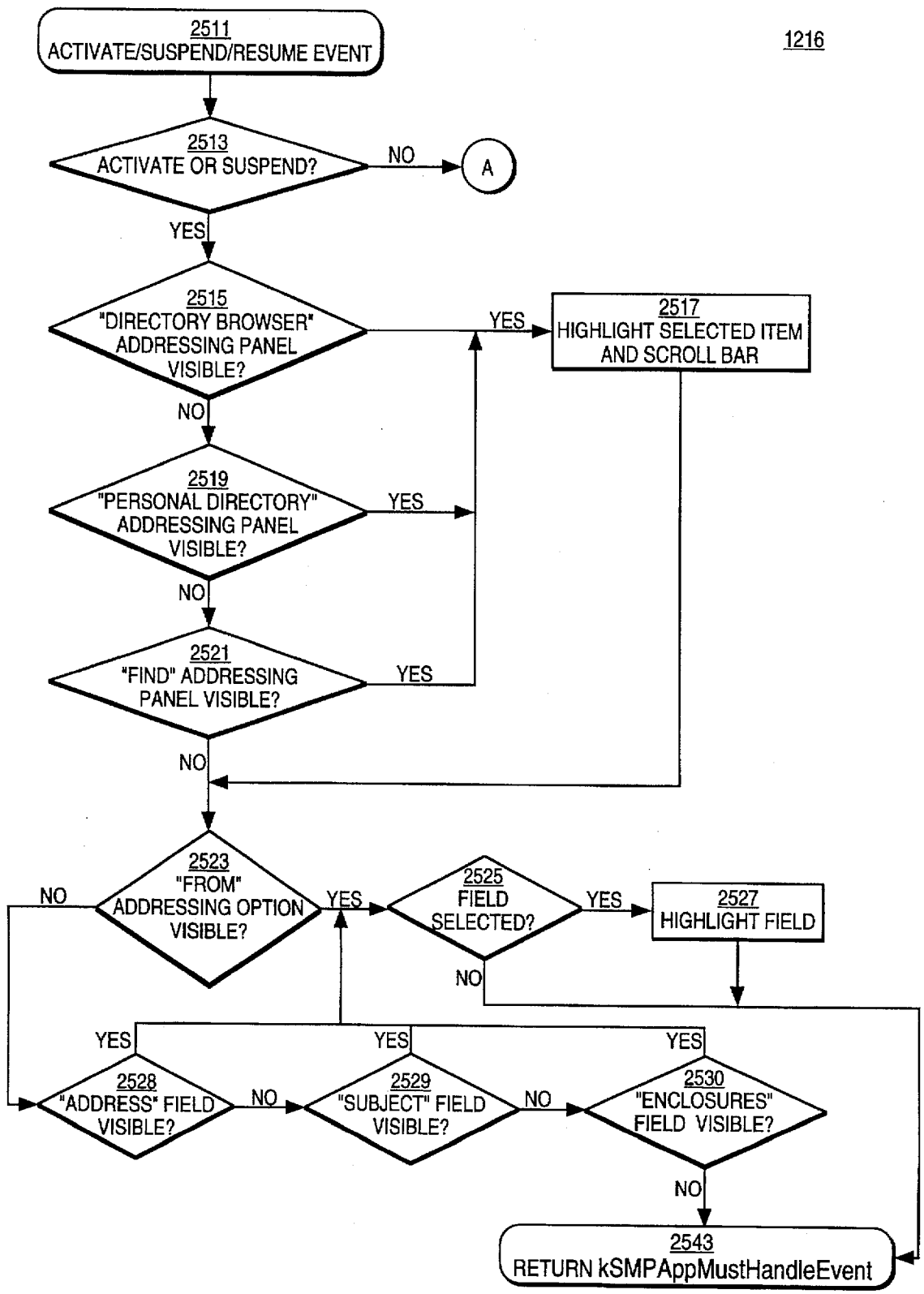
Figure 25B:
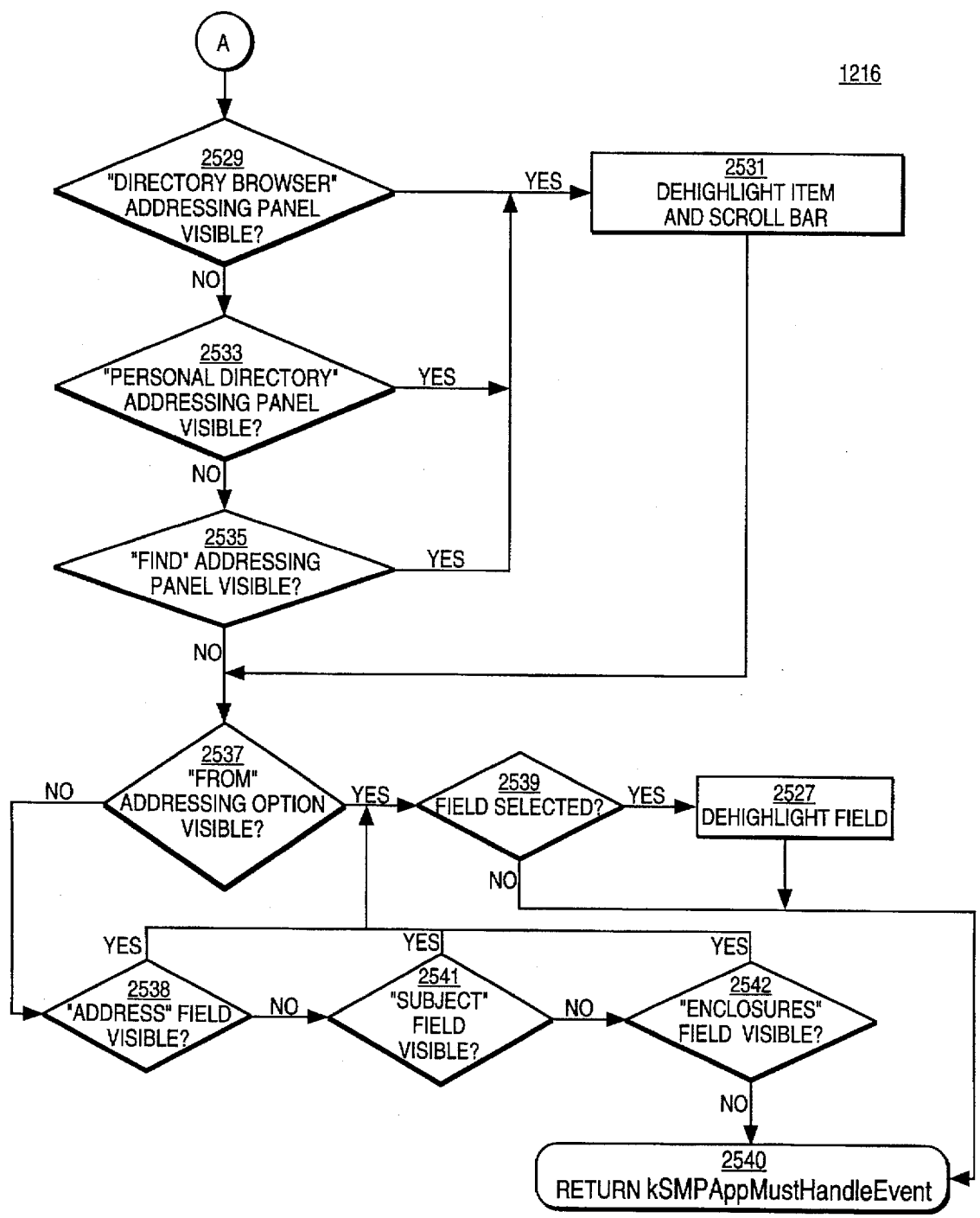

The mailer event preprocessor specified at step 1003 of FIG. 10a will now be discussed. This is graphically illustrated in FIG. 12. The mailer event preprocessor entry point is shown as 1201 in FIG. 12. The mailer event preprocessor comprises a series of checks to determine what type of event has been detected. If the event one which the mailer should handle, then the mailer routine performs an action. The event may either be required to be handled by the mailer process only, the mailer process and application program, or the application program only. Appropriate subprocesses or subroutines are invoked to service different events serviced by the mailer preprocessor. At step 1203, it is determined whether a "null" event has occurred. If so, then process 1204 in FIG. 19 is invoked. If it is a "mouse down" event, as detected at step 1205 (the user has depressed the selection device), for example, then process 1206 of FIGS. 20a–20e is invoked. If the selection device has been released (a "mouse up" event), as determined at step 1207, then the appropriate subprocess 1208 of FIG. 12 is invoked. If it is a "key down" event (the user has selected one of the keys on keyboard input device 122 shown in FIG. 1), then subprocess 1210 of FIG. 22 is invoked. If the event is an "update" event (the display must be updated), as determined at step 1211, then subprocess 1212 shown in FIG. 23 is executed. If it is a "disk insert" event, as detected at step 1213 (a disk has been inserted into a disk drive in the computer system), then subprocess 1214 is invoked, as is shown in FIG. 24. Finally, if it is one of the activate, suspend, or resume events, as detected at step 1215, then the appropriate subprocess 1216 is invoked, as is shown in FIGS. 25a–25b. If none of the events shown in mailer event preprocessor 1003 has been detected, then it is assumed that the event is one which the application program event handler 1007 must service, and process 1003 returns at step 1217 to main event processing loop 1000 with the flag kSMPAppMustHandleEvent set. Thus, the main application event handler will be invoked at step 1007, as is shown in FIG. 10a.

Each of the subprocesses invoked by main event processing loop 1000, or mailer event preprocessor 1003, will now be discussed. For example, as is shown in process 1016 of FIG. 13a, the "send" menu option is described in detail. This process is invoked for allowing an entity to send a mailer, its associated content and attached files to another entity in the network. 1016 starts at process entry point 1319 and displays the "send options" dialog box to allow the user to specify various options regarding the manner in which the mailer is to be sent. Then, the process calls the standard mailer routine SMPBeginSend at step 1323. This process performs various actions, such as preparing the letter for mailing, including all addresses of recipients in the datum to be sent across the mail system, preparing the subject field, and including any enclosure files within the letter to be sent. In addition, the "send" option's dialog allows the user to send the data in a variety of ways. These different options are specified at steps 1327, 1331, and 1335 of FIG. 13a. At step 1327, it is determined whether the user would like an image of the file to be sent along with the mailer. This allows the receiving user to view the data using standard graphics routines available for the Macintosh brand computer system, even though the receiving user may not possess the application with which the data was created. Also, facsimile (FAX) image data may be generated for transmission using well-known conversion techniques. If the data is text, an image representation of the text is generated using well-known techniques. At step 1329, the image is generated and stored in the mailer datum transmitted to the recipients. Then, process 1016 continues at step 1331.

At step 1331, it is determined whether the standard interchange format is desired to be sent by the user. If so, then the standard mailer package routine SMPAddContent is called which allows the data to be saved in an interchange format at step 1333. The standard interchange format allows other application programs than the application program which created the data to read the data. This may include, for example, text created by a word processor. Thus, text generated using one application program may be viewed and modified by the receiving user using another application program by retrieving the standard interchange format data. This standard interchange format may include rich text format (.rtf) which is available under such applications as Microsoft Word 5.0 brand word processor available from Microsoft Corporation of Redmond, Wash. Of course, other document or generic file description formats are contemplated within the scope of the present invention as they become available for storing a variety of data, e.g., text, graphics, sound, animations (sequences of images), etc.

At step 1335, it is determined whether the user wishes to save the data in the application program's native format. If so, then this format of data is also saved in the mailer datum, as shown in step 1337 of FIG. 13a, by writing a file in the normal manner for this application program then enclosing this file as the "main enclosure." At step 1339, the routine call SMPEndSend is made to complete the generation of data for the mailer.

Figure 13B:
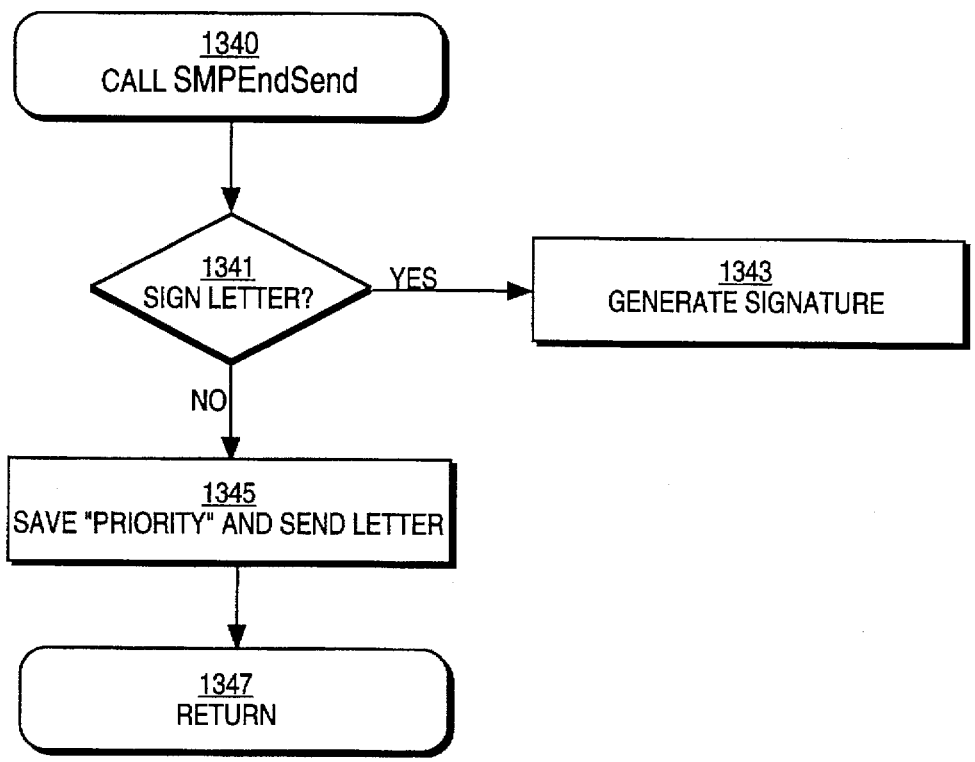

A more detailed view of step 1339 (the process SMPEndSend) is shown in FIG. 13b. SMPEndSend starts at step 1340, the process entry point. At step 1341, it is determined whether the user wishes to digitally sign the letter. If so, then the routine to generate the digital signature is invoked at step 1343 (e.g., the digital signature verification process software available from RSA Digital Security, Inc. of Belmont, Calif.). This allows the recipient to confirm the source from which the mailer was sent. Then, at step 1345, process 1016 ends by saving the letter's "priority," and the letter is prepared to be sent across network 130 to any recipients. Processes 1339 and 1016 then returns to main event processing loop 1000 at step 1346.

Figure 14:
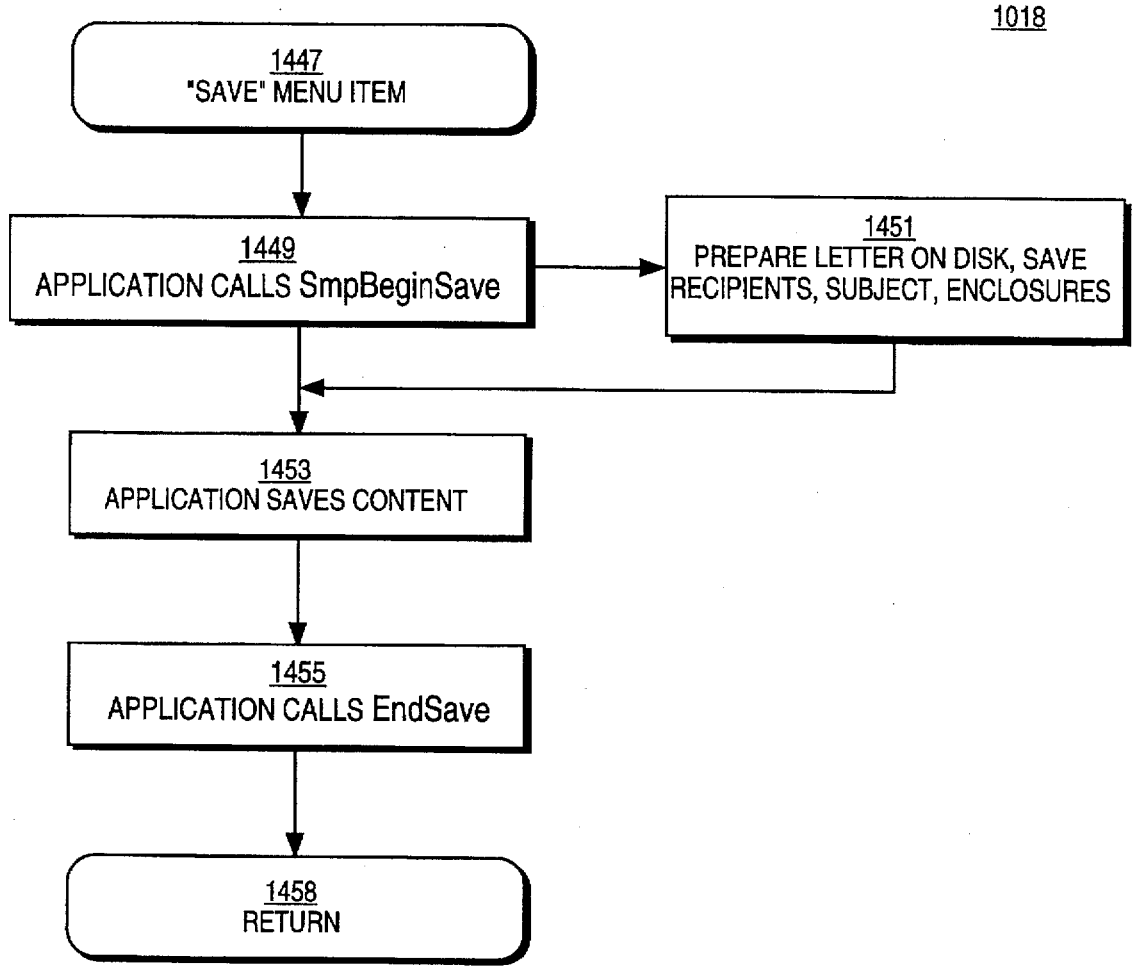

Process 1018 FIG. 14 shows a detailed flowchart of a subprocess which is executed when the "save" pull-down menu item of the display is selected. 1447 shows the process entry point, and the underlying application program calls the standard mailer package routine SMPBeginSave. This routine directs the standard mailer package to prepare the letter on disk, or other fixed media device (e.g., 107 of FIG. 1), to save all associated mailer information at step 1451, such as recipients for the message, a subject field, and retrieve and store any enclosures which are to be transmitted with the message. At step 1453, the application program is directed to save the native content application data to a specified file in the normal manner for this application program. The application program then invokes the EndSave routine at step 1455 which does all postprocessing necessary for completing the save of the mailer and content. This includes saving the mailer, now known as a "letter," including the content to a storage device, such as a disk drive such as 107 shown in FIG. 1. Then, process 1018 returns to event loop 1000.

FIG. 15 shows process 1026 in detail which is invoked if the user selects the "forward" menu item. This process is straightforward, wherein, at the entry point 1559, a new mailer is added to the currently displayed window at step 1561, such as was described with reference to FIG. 5. When a forwarded mailer is added to the window, as is shown, for example, in FIG. 5, a turned-up corner 565 representation is displayed, which indicates that more than one mailer is associated with the application data. A user can then, if desired, access the mailers in the forwarding chain by selecting icon 565 as many times as necessary. Process 1026 returns at step 1562 to main event processing loop 1000 shown in FIG. 10a.

The "reply" pull-down menu item handler is shown as 1027 of FIG. 16. The "reply" menu item generates a new mailer and copies the content of the "from" to the "recipients" field and the current "recipients" to the "from" field. A current recipient can thus reply to a mail message. Step 1663 shows the "reply" option entry point, and step 1665 shows the operative steps, i.e., creating a new mailer which is also nested with the old mailer on the display, and copying of the information contained in the "from" field (e.g., 230 in FIG. 2) to the "recipients" field (e.g., 231 in FIG. 2) so that the originator of the message becomes the recipient of the reply. Other recipients (e.g., if there were plural original recipients) may also be the target of the message if a "reply to all option" has been selected by the user. Then, 1027 returns at step 1666 to process 1000 of FIG. 10a, and event handling continues in the normal fashion.

Subprocess 1028 of FIG. 17 is a flow diagram illustrating the steps for printing a mailer and the associated application program content. This occurs when the "print" menu option has been selected, as detected at step 1021 of FIG. 10b. The entry point is shown as 1767, and, at step 1768, the subprocess SMPPrepareCoverPages is called which images each page of each of the nested mailers is imaged at step 1768 using typical prior art techniques of imaging a display for printing on a hard copy output device. At step 1769, the routine SMPDrawN$^{th}$CoverPages is called to print specific pages of the mailer. It is determined whether cover pages are complete at step 1770. Then, at step 1771, the application program content is printed on an output device such as 124 shown in FIG. 1. Then, at step 1772, the process returns to main event loop 1000.

Figure 18:
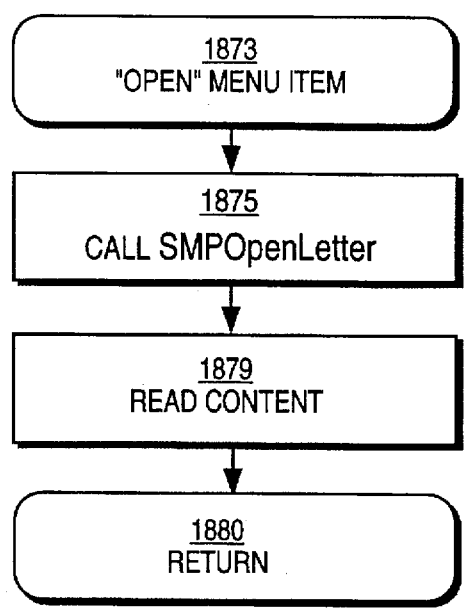

1029 of FIG. 18 illustrates a flow diagram of actions which occur after selection of the "open" menu option, as detected at step 1023 shown in FIG. 10b. The process starts at routine entry point 1873 and calls the standard mailer package routine SMPOpenLetter at step 1875 to perform various operations. These operations include opening the mailer letter, reading all the appropriate fields, such as the "recipients" field, the "from" field, the "subject" field, the "date" field, and the "enclosures" included with the message, and obtaining the digital signature, if any. Then, the application program reads the content of the letter at step 1879.

If the program which created the content is not present on the recipient's computer system, then a suitable standard application program (SAP) is invoked to read the data in a format which may be interpreted by the user's machine. One of the formats transmitted by the user who created the content may be retrieved for this purpose, such as the interchange format discussed above. Thus, any type of data transmitted by the originator may be viewed by the recipient. Then, process 1029 returns to main event processing loop 1000 of FIG. 10a at step 1880 for further event handling.

Process 1204 of FIG. 19 illustrates a detailed sequence of steps which are performed upon the detection of a "null" event. A null event is one which is well-known to those skilled in the Macintosh® programming art and is typically used for performing periodic tasks in between user-generated events. Upon the entry point into the null event processing routine at step 1981, it is determined at step 1983 whether the cursor position is over "mailer" portion 210, for example, of the display. The position can be determined by determining the relative position of the cursor to the upper left-hand portion of the mailer window using well-known user interface programming techniques. If so, then it is determined whether the cursor is over the "subject" field of the mailer (e.g., 232 of FIG. 2) at step 1985. If so, then the cursor is changed to a different representation at step 1987, the "I-beam," which is well-known to those familiar with the Macintosh® GUI to provide feedback for text entry. When visible, this cursor means that the user can select the field over which the cursor is indicating and insert additional text. If the cursor is not over the subject field, as is determined at step 1985, then the cursor may be changed to an "arrow" representation at step 1989. Both steps return to main null event loop process 1204.

It is determined at step 1991 whether the "find" addressing panel (e.g., 900 of FIG. 9) is visible. This condition and the next three conditions, 1995, 1999, and 1903, respectively, each refer to the automatic selection panels 600, 700, and 800. If the "find" addressing panel is visible, as detected at step 1991, then the next "batch" of entity addresses is found at step 1993 using techniques similar to file-searching mechanisms in a file system. The process continues at step 1907. If the "find" addressing panel is not visible but the browsing panel is detected at step 1995, then addresses in the "directory browser" addressing panel are updated at step 1997, and process 1204 proceeds and continues at step 1907. If, however, neither the "find" nor the "browsing" addressing panels are visible and the "type-in" addressing panel is visible, as detected at step 1999, then the insertion point of the type-in address field (e.g., in field 820 of FIG. 8) is flashed at step 1901 for typing in the address, and the process continues at step 1907. If the "Personal Directory" addressing panel is visible (e.g., 600 of FIG. 6), as detected at step 1903, then the addresses displayed on the panel are updated at step 1905. The process can then continue at step 1907.

If it is determined that the "subject" field of the mailer has been selected (e.g., 232 of FIG. 2) and, thus, is the target for the text which is to be inserted by the user, then the insertion point is flashed to the user at step 1909 to indicate where the text can be entered. Once this has been done, process 1204, as is shown in FIG. 19, returns at step 1911 with the flag kSMPAppMustHandleEvent set to indicate that the application must perform additional processing (normal for the application at idle time). Additional information which may be pertinent to the application may be updated based upon a detected null event.

FIGS. 20a–20e pertain to mouse down event handling process 1205, as shown in the mailer event preprocessor 1003 of FIG. 12. Mouse down events, as discussed previously, occur upon a user depressing a selection device such as a button on a mouse or trackball pointing device, for example, or the selection of a stylus on a touch-sensitive display. The process to handle the "mouse down" event is entered at step 2013, and it is determined at step 2015 whether the mouse down event occurred while the cursor was within the mailer (e.g., 210 in FIG. 2). If not, then process 1205 returns at step 2017 with the flag kSMPAppMustHandleEvent set indicating that the application event handling routine must service this particular event because the event did not occur while the cursor was in the mailer. If, however, the event was in the mailer (e.g., 210 of FIG. 2), then process 1205 proceeds to step 2019 and its succeeding steps, which all determine whether various user interface items in the mailer have been selected. These will now be discussed in more detail.

For example, at step 2019, it is determined whether the mouse down event occurred in the "recipients" field of the mailer (e.g., 231 in FIG. 2). If so, then, at step 2021, the item is selected and highlighted using position-determining techniques, and the selected entity address is made the target of the selection operation being performed. If the mouse down event was a "double click," as determined at step 2023, then the address is "opened" at step 2025 which displays more information about the address (e.g., the "full address," a user name, or other information). If, however, it was simply a single click, then it is determined whether a "drag" operation has started at step 2027 in a manner well-known to those skilled in the user interface programming arts. For example, in one embodiment, a drag start operation may be determined once a single mouse down event has occurred and the cursor has been moved at least three pixels from the position where the mouse down event was first detected. This allows actions such as dragging entity addresses between fields within the mailer window to be performed. "Dragging" and associated mechanisms for performing dragging are all well-known to those in the computer programming and GUI arts. Then, process 1205 proceeds to step 2056 on FIG. 20e, and the process returns to the main event processing loop 1000 with the flag kSMPAppShouldIgnoreEvent.

If the event occurred in the "subject" field, as determined at step 2029, then the text is selected at step 2031 (using highlighting or other similar user interface feedback), and the subject field is made the target of this user selection. Then, the process returns at step 2056 shown in FIG. 20e to event processing loop 1000.

Figure 20A:
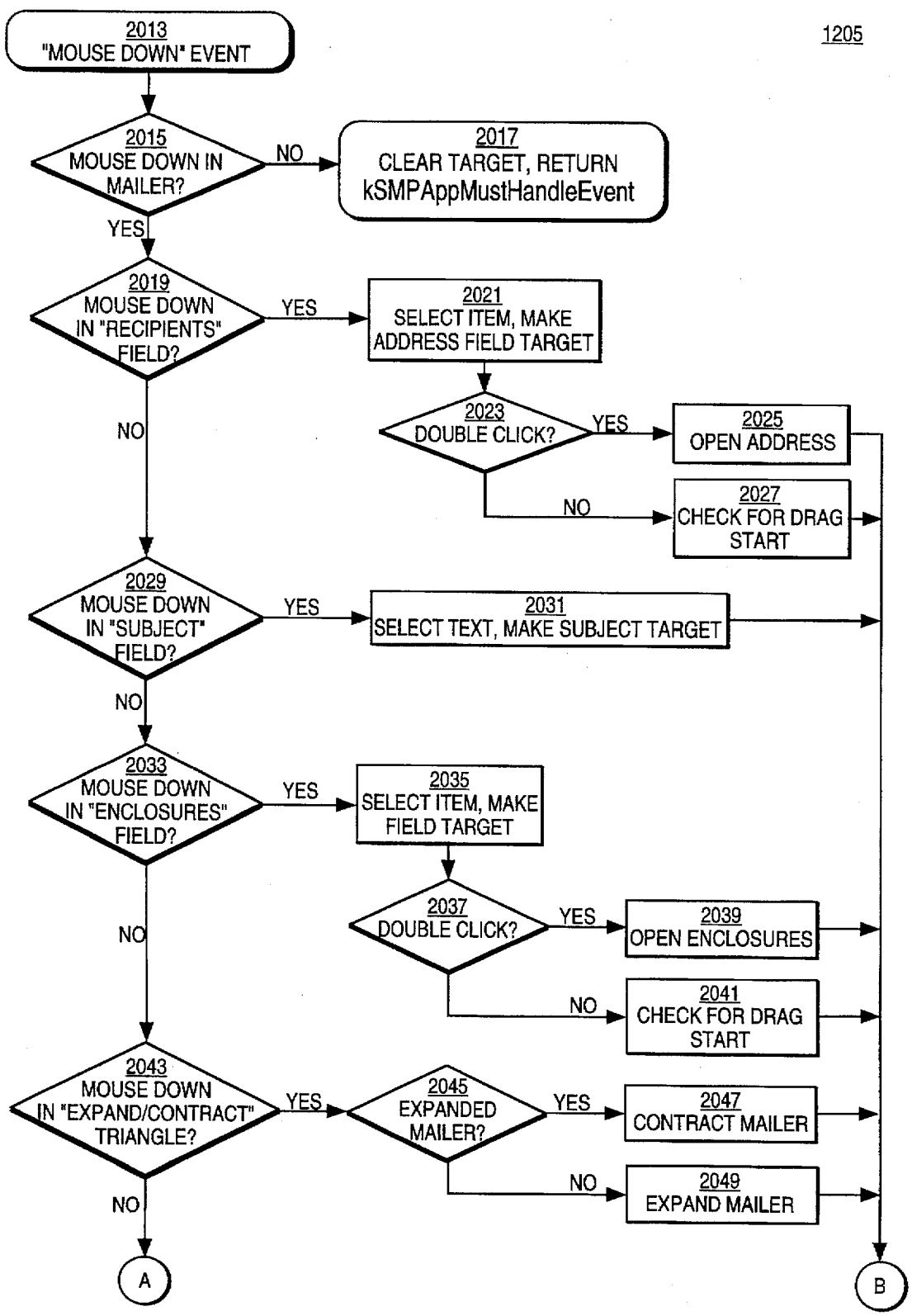

If the event occurred in the "enclosures" field (e.g., 233 in FIG. 2), as determined at step 2033, then the selected enclosures item is made the target and highlighted at step 2035, as shown in FIG. 20a. Then, it is determined at step 2037 whether, in fact, this mouse down event was a "double click," and if so, then the enclosure which has been selected is opened using a SAP or the application program which created the enclosure if the recipient possesses the application. No other user interface which Applicants are aware of has allowed this direct manipulation of enclosures. If it was not a "double click," as determined at step 2037, then it is determined whether a "drag" operation has been started at step 2041. If there is no "drag" start, then it is maintained as the target (by highlighting and returning the information in a suitable data structure for the drag operation and other processing required during a "drag"), and either of steps 2039 or 2041 leads to the return from process 1205 to main event loop 1000 with the flag kSMPAppShouldIgnoreEvent set at step 2056 of FIG. 20e.

If the mouse down event occurred in the "expand/contract" triangle (e.g., 250 shown in FIG. 2), then, depending on the state of the mailer, the mailer is either "contracted" or "expanded." Step 2045 determines whether the mailer is in an expanded or contracted state and performs the appropriate operation. 250, thus, acts as a toggle. In other words, if the mailer is expanded, then the mailer is contracted at step 2047. If the mailer is not expanded, as determined at step 2045, then it is expanded at step 2049. The contract and expand operations are done using an animation of the expansion or contraction feature to provide feedback to the user of the expansion of contraction of the mailer (e.g., 210 of FIG. 2). Process 1205, then, returns to event loop 1000 with kSMPAppShouldIgnoreEvent set at step 2056 in FIG. 20e. Other flags kSMPMailerExpanded or kSMPMailerContracted are used to indicate to the application program that the display should be updated, that is, the mailer is either expanded or contracted, and the application content (e.g., 220) should be updated by the application program.

Figure 20B:
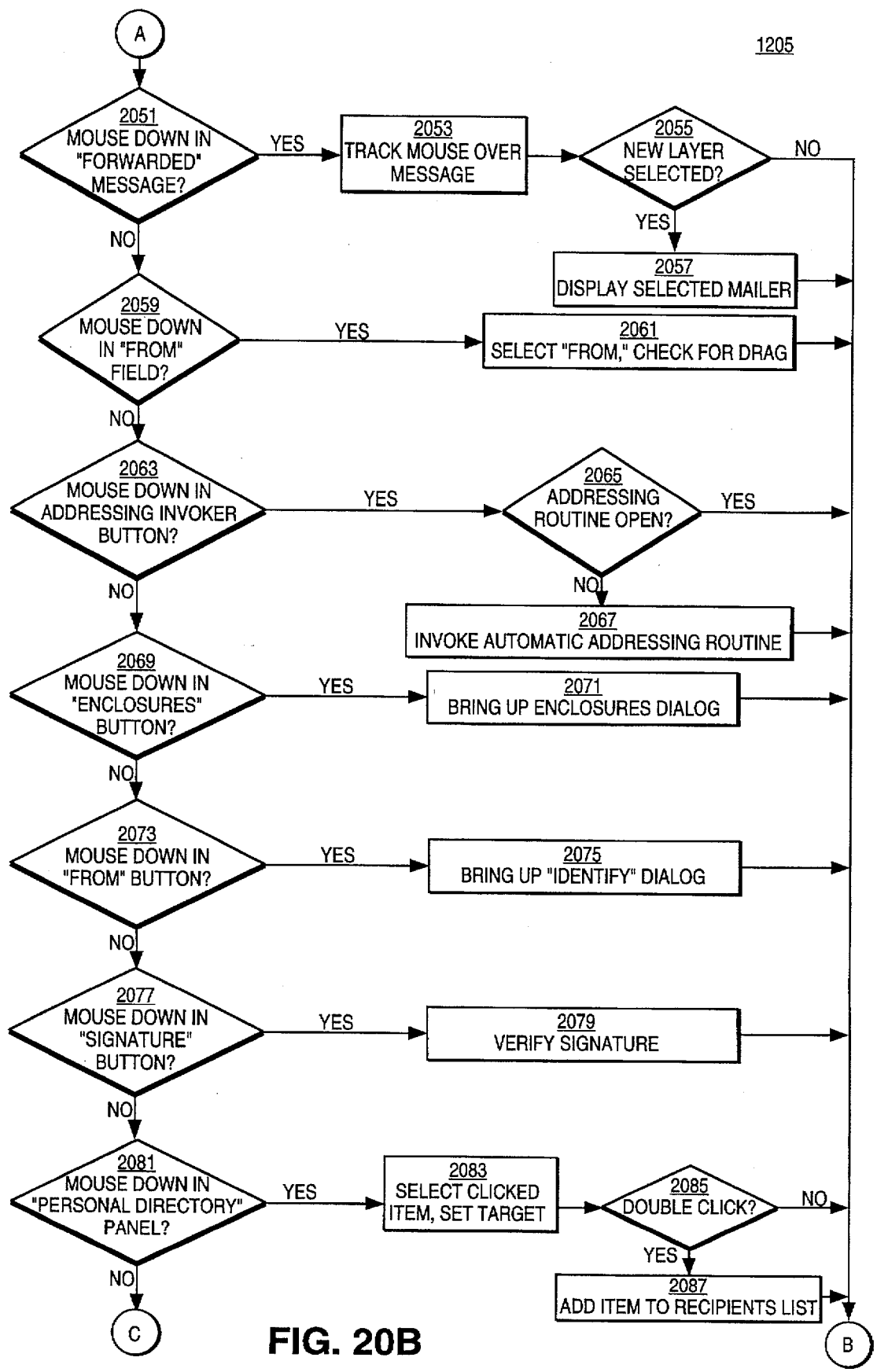

Process 1205 continues on FIG. 20b to check for other conditions which may occur during a "mouse down" event within the mailer. For example, if the mouse down event occurred while pointing to the forwarded menu (e.g., 530 of FIG. 5), as is shown in step 2051, then the mouse is tracked over the menu at step 2053, and it is determined whether a new layer of the mailer has been selected at step 2055 (e.g., by detecting selection of icon 565 in FIG. 5). If so, then the selected mailer is displayed at step 2057, and the process returns to the event handling process at step 2056 of FIG. 20e with the flag kSMPAppShouldIgnoreEventEvent set. If, however, a new layer has not been selected, as determined at step 2055, then the process returns with no action taken.

Another option which may be selected is when mouse down event occurred while in the "from" field (e.g., 230 of FIG. 2), as detected at step 2059, such as 240 in FIG. 2. If so, then, at step 2061, the "from" field is selected and highlighted (shown in reverse video or other selection feedback to the user), and a drag operation is checked for. If so, then other appropriate actions may be taken to flag other routines in the system that the drag operation is taking place. Then, the routine exits at step 2056 in FIG. 20e with the flag kSMPAppShouldIgnoreEvent set.

Step 2063 determines whether the mouse down event has been detected when the cursor is selecting automatic addressing mechanism invoker button 241 as shown in FIG. 2. If the automatic addressing routine is already open, as determined at step 2065, then no further action is taken, and the routine returns at step 2056 with kSMPAppShouldIgnoreEvent set indicating that no action need be taken by the application's event handler. If the automatic addressing routine is not already open, as determined at step 2065, then the automatic addressing panel display is invoked at step 2067, and the handling routine returns at step 2056 in FIG. 20e.

At step 2069, it is determined whether the mouse down event occurred within the enclosures invoker button (e.g., 233 in FIG. 2). If so, then an appropriate file dialog box is displayed to perform a file enclosure to the mailer is activated at step 2071, and the process returns from the preprocessing routine at step 2056 in FIG. 20e. At step 2073, if the "from" button has been selected (e.g., 240 shown in FIG. 2), then an identification dialog is activated at step 2075. As discussed previously, this will allow the user to register as another entity in the electronic mail system using well-known techniques. Such a technique may include prompting the user for an entity name and password or other similar identification procedure. Then, the process returns at step 2056 in FIG. 20e.

If the "signature" button has been selected (e.g., 360 shown in FIG. 3), as determined at step 2077, then the appropriate operations to verify the digital signature may be performed at step 2079. Of course, this option only is performed if a digital signature has been associated with a mailer, such as that represented by icon 360 shown in FIG. 3. Then, after the digital signature has been verified at step 2079, the preprocessing routine returns to main event processing loop 1000 shown in FIG. 10a via step 2056 in FIG. 20e.

The next four selections are those related to the automatic addressing panels, which were discussed with reference to FIGS. 6–9 above. The first, detected at step 2081, detects whether the mouse down event occurred within the "personal directory" panel (e.g., 600 in FIG. 6). If so, then the item which has been selected at step 2083 is highlighted and set as the target for the selection. If the mouse down detected is a "double click," as detected at step 2085, then the item may be added to an entity addressing list at step 2087 (e.g., 231 in FIG. 2). In either case, the event preprocessor is returned from at step 2056 shown in FIG. 20e.

Figure 20C:
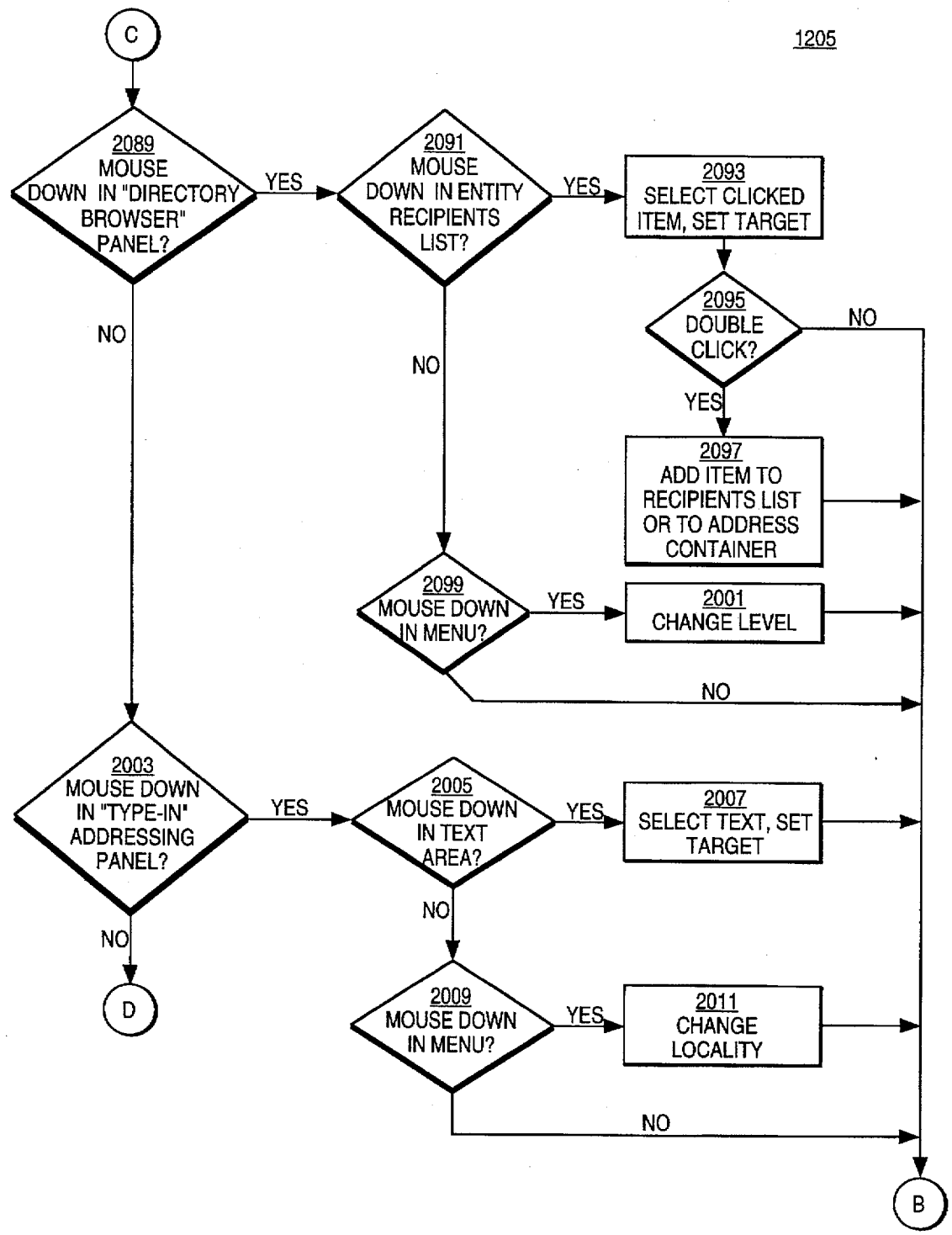

Another addressing panel option may be detected at step 2089 in FIG. 20c. This step detects whether the mouse down event occurred in the "directory browser" addressing panel (e.g., 700 in FIG. 7). If so, then a variety of actions may be performed. If the mouse down event occurred in the list of addresses (e.g., region 720 of FIG. 7), then it can be determined whether one of the addresses has been selected. If so, at step 2093, then the selected item is highlighted and set as the target. If the mouse down event was a "double-click" operation, as detected at step 2095, then, at step 2097, the entity address for the selected item may be added to the addressing list for the mailer selected (region 231 in FIG. 2) or, if the selected item was a container (e.g., a folder for entity addresses), then enter that container. Then, the event preprocessor is returned from at step 2056 shown in FIG. 20e. If, however, the mouse down event was not in the recipients list, then it can be determined at step 2099 whether the menu in the addressing panel has been selected (e.g., 710 in FIG. 7). If so, then the user is allowed to change the level in which he is operating at step 2001. Then, after the changing of the level performed at step 2001, the event preprocessor may be returned from at step 2056 shown in FIG. 20e. If not, then no level change is performed, and the event preprocessor is returned from at step 2056. At step 2003, it is determined whether the "Type-In" addressing panel (e.g., 800 in FIG. 8) is where the mouse down event was detected. If so, then it is determined at step 2005 whether the text area of the type-in addressing (e.g., 820 of FIG. 8), is the region selected by the user. If so, then the text is selected (highlighted) at step 2007 and is set as the target for text entry. Then, the event preprocessor returns at step 2056 in FIG. 20e. If the selection was not in the text area, as detected at step 2005, then it is determined whether the selection was in the menu region (e.g., 810 of FIG. 8) at step 2009. If so, then the user is allowed to change the locality (type of address) specified in 810 of FIG. 8. This is performed at step 2011 shown in FIG. 20c. If not, however, no action is performed, and in either case, the event preprocessor is returned from at step 2056 in FIG. 20e.

Figure 20D:
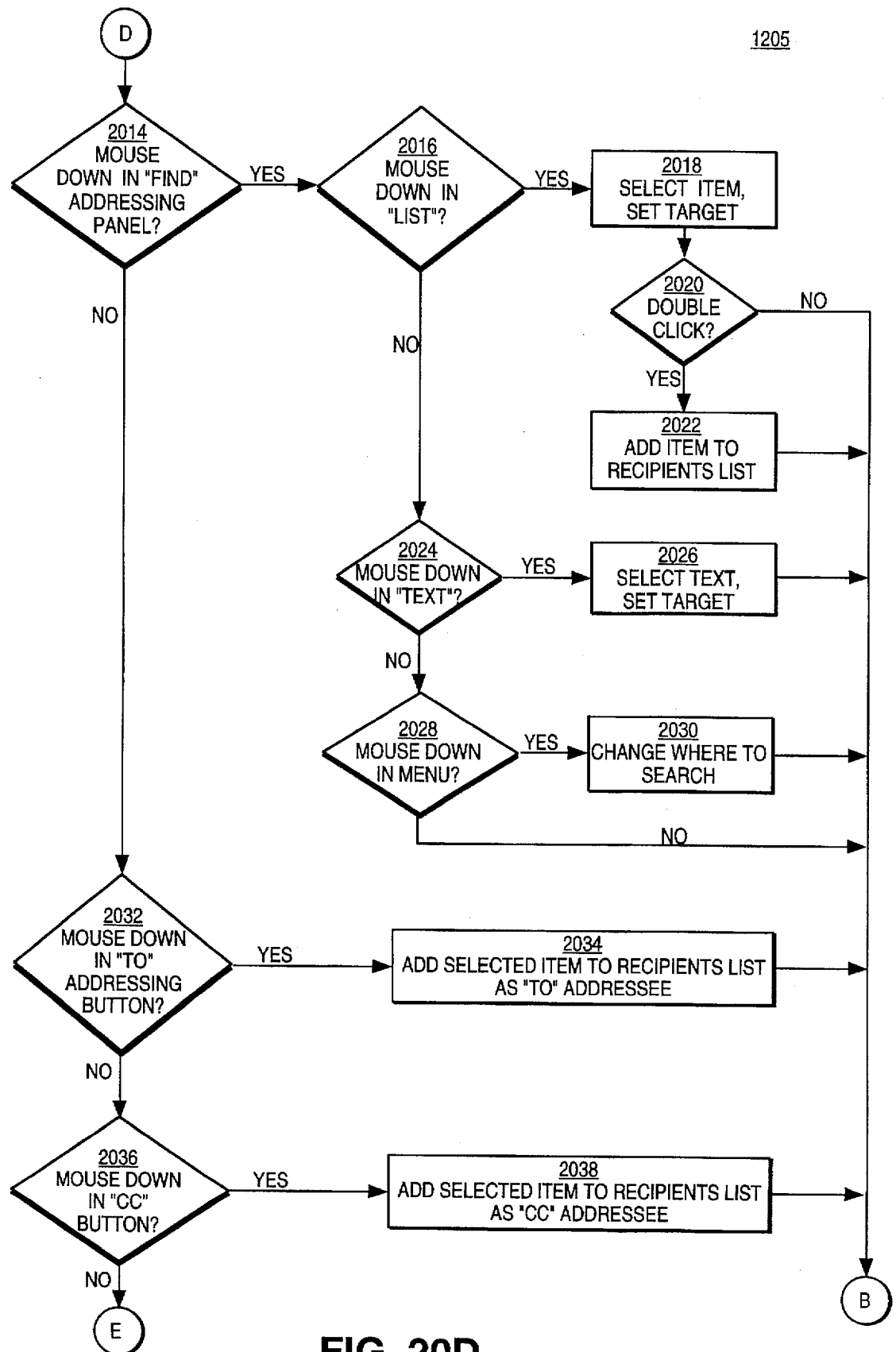
Figure 20E:
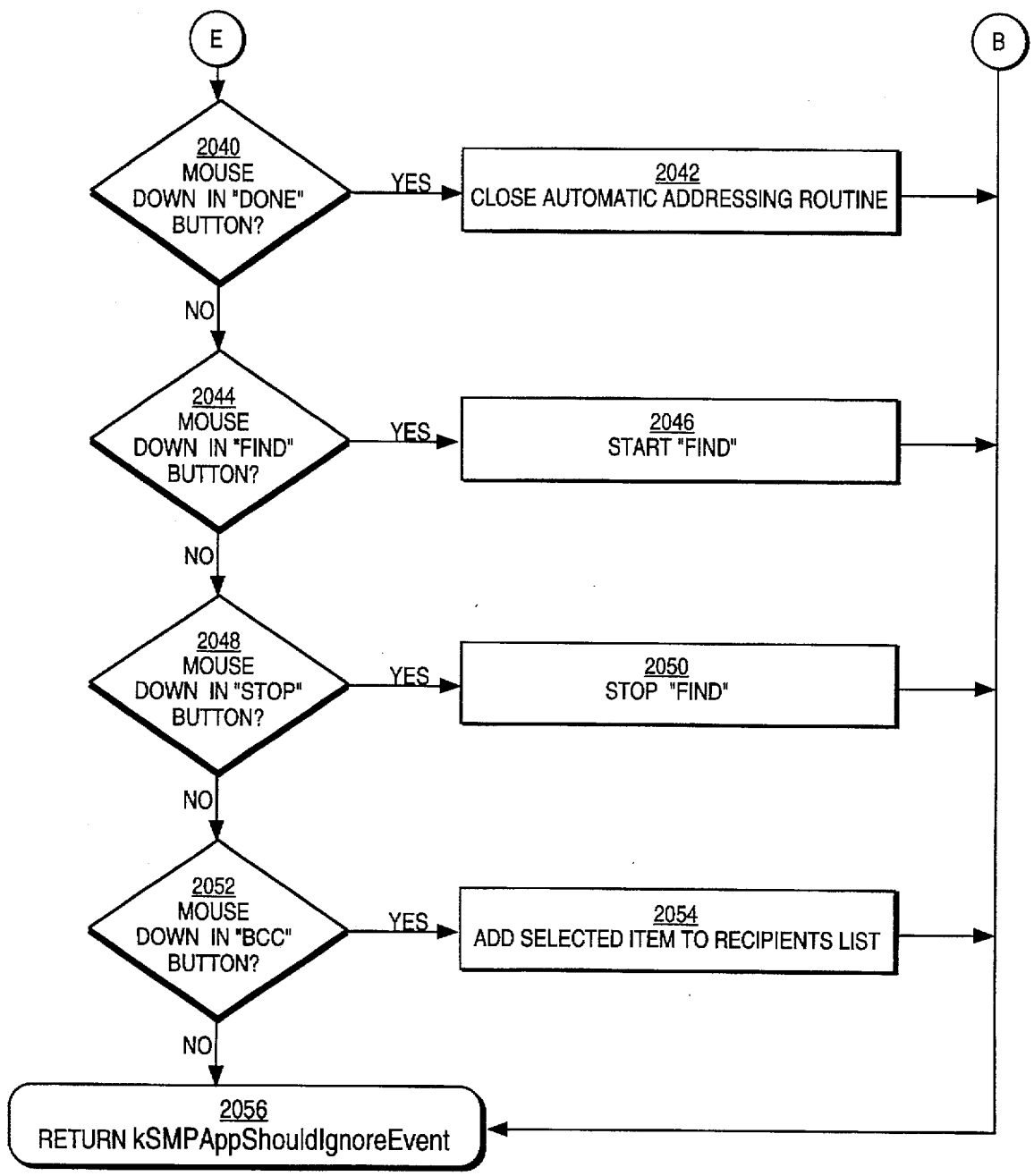

FIGS. 20d and 20e show additional options which may be available during processing of events by the event preprocessor. For example, at step 2014, it is determined whether the mouse down event occurred in the "Find" addressing panel (e.g., 900 in FIG. 9). If the find addressing panel is not displayed, then no such determination is made. It is, then, determined whether the mouse down event is in the list of entities found (such as those shown as 920 in FIG. 9). If so, then the entity name at the position detected at step 2018 is highlighted and set as the target. If a "double-click" operation is being performed, as determined at step 2020, then the selected entity is added to recipients list 231 at step 2022, and the process returns at step 2056 shown in FIG. 20e. If it was not a double-click operation, then the process returns with the selected entity highlighted and set as the target. If, however, the mouse down event was not within the recipients list but, instead, is in the text region (e.g., 910 of FIG. 9), as detected at step 2024, then the text is highlighted and selected at step 2026 and set as the target. This, then, will allow the user, using typical input techniques (e.g., entering a string using keyboard 122 in FIG. 1), to type in search text. Then, the preprocessing routine returns at step 2056 in FIG. 20e. If, however, the selection is not in the text region, as determined at step 2024, but, instead, ii in the menu portion (e.g., 930 of find addressing panel 900), as detected at step 2028, then the user is allowed to modify where he would like the search performed at step 2030. No action is performed if the selection was not in the menu. In either case, a return to main event processing loop 1000 is performed at step 2056.

At step 2032, it is determined whether the mouse down event occurred within the "recipients" addressing button (e.g., 622 in FIGS. 6–9). If so, then the selected item is added to the recipients list at step 2034 as a "to" addressee. Then, the preprocessing routine is returned from at step 2056 shown in FIG. 20e. If, however, the "CC" button is the position of the location of the mouse down event, as detected at step 2036 (e.g., 621 shown in FIGS. 6–9), then the selected item may be added to the recipients list at step 2038 as a "CC" addressee. Then, the event preprocessor returns to event loop 1000 at step 2056 shown in FIG. 20e.

The remaining options of preprocessor 1205 are shown in FIG. 20e. For example, at step 2040, it is determined whether the cursor is over the "done" button (620 in FIGS. 6–9). If so, then the automatic addressing routine is caused to exit at step 2042, and the selection panel is hidden (e.g., 900). All addresses that the user has desired to place into the recipients list 231 are complete. Then, at step 2056, the event preprocessor returns. If, however, the mouse down event occurred while pointing at the "find" button, which is displayed when the user inputs a search string in field 910. Once the find button has been determined to be selected at step 2044, then the find operation is commenced at step 2046 to find the addresses specified in "Find" addressing panel 900. If, however, the "stop" button is the position of the mouse down event, as detected at step 2048 (not shown in FIG. 9 but visible when a "find" operation is taking place), then the find operation is aborted at step 2050. Then, the preprocessor returns at step 2056. Finally, at step 2052, it is determined whether the mouse down event occurs while pointing at the "BCC" button at step 2052. If so, the entity is added as a "BCC" addressee to the recipients list at step 2054. Then, the event preprocessor is complete and returns to main event processing loop 1000 with the flag kSMPAppShouldIgnoreEvent set to indicate that the application program event handling routine should not process the event. The event preprocessor is then complete.

Figure 21:
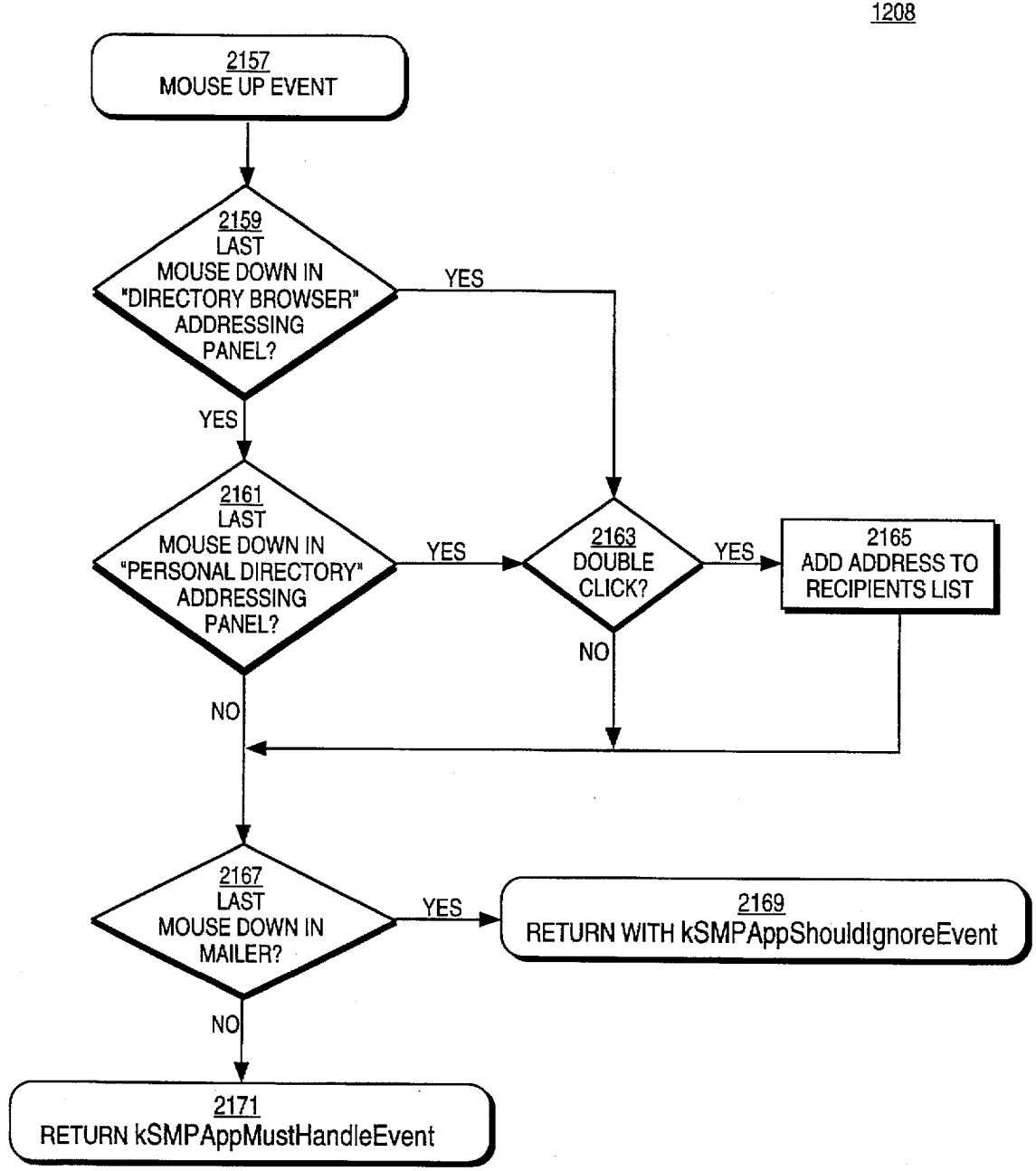

Yet another event which may be detected by the event preprocessor is a "mouse up" event. This is shown as 1208 in FIG. 21. The mouse up event was detected at step 1207 shown in the mailer event preprocessor in FIG. 12. The mouse up entry point is shown as 2157. It is determined whether the mouse up event pertains to the last mouse down in the "Directory Browser" addressing panel (e.g., 700 in FIG. 7). This is detected at step 2159, and, if it is a "double click," as determined at step 2163, then the address is added to the recipients list (e.g., 231 shown in FIG. 2). Similarly, if it is a last click in the "Personal Directory" addressing panel, as detected at step 2161, then it is determined whether it was a "double click" at step 2163. If so, the address is added to the recipients list at step 2165. If it was not a double click, then no action is performed. Step 2167 determines whether the last mouse down was in the mailer window. If so, then the "mouse up" event handling routine 1208 is returned from at step 2169 to main event loop 1000 with the flag kSMPAppShouldIgnoreEvent to indicate that the application should not handle the event. If, however, the last mouse down event was not in the mailer, then the flag kSMPAppMustHandleEvent is returned at step 2171, and the application event handler in process 1000 will handle the event at step 1007 shown in the main event loop 1000 of FIG. 10a.

Key down events, such as those detected at step 1209 in FIG. 12, are handled by subprocess 1210 in FIG. 22. The entry point of this process is shown as 2273 in FIG. 22. It is determined at step 2275 whether the key down event has occurred within a "received" mailer (e.g., 310 in FIG. 3). If so, then the process immediately returns with the flag kSMPAppMustHandleEvent indicating that the application must handle the event since a received mailer cannot be modified by a recipient. If, however, it was not a received mailer, then it is determined whether the "subject" field (e.g., 232 in FIG. 2) is the target of the "key down" event at step 2277. If so, then the selected key by the user is added to the "subject" field at step 2279, and the process returns at step 2295 with the flag kSMPAppShouldIgnoreEvent indicating that the application event handler should not process the event.

Steps 2281, 2285, and 2289 all perform similar checks for the "Type-In" addressing panel (e.g., 800 in FIG. 8), the "recipients" field (e.g., 231 in FIG. 2), and the "enclosures" field (e.g., 233 of FIG. 2). Each will add the character entered by the keystroke to the selected field, as shown at steps 2283, 2287, and 2291, in a similar manner to the "subject" field discussed with reference to steps 2277 and 2279 above. Each of the respective key presses, then, leads to the return at step 2295 with the flag kSMPAppShouldIgnoreEvent set to indicate that the application event handler should not service the event. If, however, none of these options are selected, then the process returns at step 2293 flagging that the application must handle the event. That is, apparently, the key press was not intended for the mailer, and the application program's handler is allowed to then process the event. As discussed previously, in certain environments, the "key down" event is analogous, in pen-based systems to a stylus or pen down and character write event by the user. In this instance, the operation is analogous with appropriate events for the touch-sensitive device's application.

In FIG. 23, process 1212 is used for handling the update event, as detected in mailer event preprocessor 1003. This is a simple routine which merely updates (redraws) all the displayed fields in the mailer (e.g., 210 of FIG. 2) at step 2399 and immediately returns with the flag kSMPAppMustHandleEvent at step 2301 to allow the application to update its display portion (e.g., 220 of FIG. 2) as well.

1214 of FIG. 24 shows the results of a "disk insert" event being detected. The entry point is shown as 2403, and it is determined whether the "Directory Browser" addressing panel (e.g., 700 shown in FIG. 7), is visible at step 2405. If so, then the inserted disk is displayed at step 2407. In either case, routine 1214 is returned from at step 2409 with the flag kSMPAppMustHandleEvent so that any appropriate action by the application program event handler can be taken.

The activate/suspend/resume event, which was detected at step 1215 in mailer event preprocessor 1003 shown in FIG. 12, is shown in more detail as process 1216 in FIGS. 25a and 25b. The entry point is shown as 2511, and it is determined at step 2513 whether the event is an "activate" or "suspend" execution event. If it is an "activate" or "suspend" event, then the process continues at step 2515. If not, the process continues at step 2529 of FIG. 25b. If it is an activate or suspend event, as determined at step 2513, then, at step 2515, it is determined whether the "Directory Browser" addressing panel is displayed (e.g., 700 of FIG. 7). If so, then the selected item in the "directory browser" addressing panel and the scroll bar is highlighted at step 2517, and the process continues at step 2523. If, however, the "Directory Browser" is not visible but either the "Personal Directory" addressing panel (e.g., 600 of FIG. 6) or the "Find" addressing panel (e.g., 900 of FIG. 9) are displayed, as detected at steps 2519 or 2521, then the highlighting of the selected entity and the scroll bar is performed at step 2517, and the process continues at step 2523. If, however, none of the three panels was displayed, as detected at steps 2515, 2519, or 2521, then it is determined whether the "From" addressing option is visible at step 2523. Similarly, at steps 2528, 2529, and 2530, the "address," "subject," and "enclosures" fields are checked if they are visible. If any of the fields are visible, then it is determined at step 2525 whether the field has been selected. If so, then the field is highlighted at step 2527, and subprocess 1216 returns to the main event handler at step 2543 with the flag kSMPAppMustHandleEvent to indicate that the application program should also handle the event.

If it is other than an activate or suspend event, as was detected at step 2513, that is, it is a "resume" event, then process 1216 continues, as is shown in FIG. 25b. It is determined at steps 2529, 2533, or 2535 whether any of the "Directory Browser," "Personal Directory" or "Find" addressing panels are displayed. If so, then the selected item is dehighlighted at step 2531, and the process continues at step 2537. Steps 2537, 2538, 2541, and 2542 determine whether any of the "from," "address," "subject," or "enclosures" fields are visible. If so, and the field has been selected, as determined at step 2539, then the field is dehighlighted at step 2527, and 1216 returns at step 2540 with kSMPAppMustHandleEvent to main event processing loop 1000.

Different portions of the mailer preprocessing routines are executed depending on several factors. One factor includes whether the mailer is in an expanded or contracted state. Another factor is whether the mailer is a received mailer or a draft mailer. 1003 in FIG. 12 shows an example of preprocessing for a mailer. Note that the preprocessing routine is, in actuality, a series of routines, in a preferred embodiment, however, they have been separated in the manner shown in the figures for the sake of clarity. Note that, in this application, various flowcharts and other descriptions of method and apparatus have been set forth, and the underlying description of the functional routines which perform various operations controlled by the user interface are not described in detail. The underlying functions for transmitting and receiving messages, and other related functions, may be performed, in one embodiment, using prior art electronic mail techniques, such as those provided in the QuickMail brand system available from CE Software of West Des Moines, Iowa, or the Microsoft Mail system available from Microsoft Corporation of Redmond, Wash., for example. However, departures from these systems may be performed as can be appreciated by one skilled in the art.

Thus, the foregoing has described operations which may be performed when various events have been detected, as is commonly detected in the Macintosh® brand GUI. It can be appreciated by one skilled in the art, however, that other options not discussed herein may be performed in a similar manner. It also can be appreciated that the options which are pertinent to specific screens or windows are only active during the display of those screens. Further, the foregoing has been implemented within the event preprocessor using a suitable programming construct, such as a "CASE" statement which allows all of the actions to be specified in one continuous list. Thus, no flow-type condition testing, as is shown in decision blocks throughout the flow diagrams, may need to be performed. It can be appreciated by one skilled in the art that other programming constructs may be used, such as "IF/THEN" statements or other similar programming constructs.

Thus, an improved user interface for electronic mail has been described. Although the present invention has been described particularly with reference to specific data structures, processes, etc., it may be appreciated by one skilled in the art that departures and modifications may be made by one of ordinary skill in the art without departing from the general spirit and scope of the present invention.

What is claimed is:

1. A computer-implemented method of integrating electronic mail functionality into an application program which does not support said electronic mail functionality, said application program displayed on a computer display, comprising the following steps:
   a. executing a set of mail routines wherein said set of mail routines associates a mailer object to said application program and associates a mailer datum object to data native to said application program to thereby integrate said electronic mail functionality into said application program;
   b. displaying said mailer on a first portion of said application program and displaying said mailer datum on a second portion of said application program;
   c. enabling said user, through said mail routines, to modify said data native to said application program via functionality of said application program and modify said mailer via said functionality of said mail routines; and
   d. enabling said user, through said mail routines, to perform electronic mail functions provided by said mail routines by enabling and detecting user modification of said mailer and performing said electronic mail functions responsive thereto; and wherein said step of enabling said user to perform electronic mail functions provided by said mail routines includes saving said application program data displayed in said second portion of said application program's display as content of mail messages processed by said mail routines.

2. The computer-implemented method of claim 1 further comprising the step of displaying a contraction/expansion toggle, and responsive to user selections thereto, compressing the displayed representation of said mailer to a condensed representation in said first portion of said display, and further responsive to other user selections, expanding the displayed representation of said mailer to an original expanded state in said first portion of said display, said contraction/expansion toggle providing a plurality of displayed representations of said integration of said electronic mail functionality into said application program.

3. The computer implemented method of claim 1 wherein said mailer comprises a header which enables user control of said mail functionality provided by said set of mail routines including the following:
   a. an origination field indicating the user from whom said mailer is received;
   b. a destination field indicating the user to whom the mailer is addressed;
   c. a subject field indicating a subject to which the mailer pertains;
   d. an attachments field indicating any additional files to be associated and transmitted with said mailer.

4. The computer implemented method of claim 1 wherein said mail routines include an event preprocessor inserted into an event processing loop in said application program, said event preprocessor determining whether events are pertinent to said electronic mail functions, and responsive thereto, if said events are pertinent to said electronic mail functions, servicing said events to perform said electronic mail functions, and further, alerting said application program that said events require servicing by said application program if said events are pertinent to said application program.

5. The computer-implemented method of claim 4 wherein said step of said event preprocessor determining if said events are pertinent to said electronic mail functions includes determining whether an event has occurred which requires said modification of said mailer.

6. The computer-implemented method of claim 4 wherein said step of said event preprocessor alerting said application program that said events require servicing by said application program includes issuing a flag to said application program indicating that said application program should handle said event.

7. The computer-implemented method of claim 1 wherein said step of saving said application program data as content of said mail messages processed by said mail routines includes saving multiple representations of said application program data for said application program in a mail message processed by said mail routines.

8. The computer-implemented method of claim 7 wherein said step of saving said multiple representations of said data includes saving said data in a native format of said application program and in an interchange format.

9. The method of claim 8 wherein the interchange format of said data comprises a standard interchange representation of said data.

10. The method of claim 8 wherein the interchange format of said data comprises an image representation of said data.

11. An apparatus in a computer system for integrating electronic mail functionality into an application program which does not support said electronic mail functionality comprising:
   a. a first circuit executing a set of mail routines which causes the association of a mailer object to said application program and the association of a mailer datum object to data native to said application program to thereby integrate electronic mail functionality into said application program;

b. a second circuit, coupled to said first circuit, displaying said mailer which enables user control of said mail functionality provided by said set of mail routines on a first portion of an application window along with data native to said application program displayed in a second portion of said window;

c. a third circuit coupled to said second circuit and enabling said user to modify said data native to said application program via functionality of said application program and to modify said mailer via said functionality of said second circuit; and d. a fourth circuit coupled to said third circuit and enabling said user to perform electronic mail functions provided by said second circuit by enabling and detecting user modification of said mailer and performing said electronic mail functions responsive thereto; and wherein said fourth circuit includes a sixth circuit saving said application program data displayed in said second portion of said application program's display as content of mail messages created by said first, second, and third circuits, wherein said sixth circuit saving said application program data as content of said mail messages processed by said mail routines includes a circuit saving multiple representations of said application program data for said application program in a mail message processed by said mail routines.

12. The apparatus of claim 11 wherein said circuit saving said multiple representations of said application program data saves said data in a native format of said application program and in an interchange format.

13. The apparatus of claim 11 wherein said second circuit includes an event preprocessor inserted into an event processing loop in said application program, said event preprocessor including a circuit for determining whether events are pertinent to said mail functions, and responsive thereto, if said events are pertinent to said mail functions, servicing said events to perform said functions, and further, alerting said application program that said events require servicing by said application program if said events are pertinent to said application program.

14. The apparatus of claim 13 wherein said event preprocessor includes a fifth circuit alerting said application program that said events require servicing by said application program, said fifth circuit including a circuit issuing a flag to said application program indicating that said application program should handle said event.

15. A computer-implemented method of adding electronic mail functionality to an application program which lacks said electronic mail functionality comprising the following steps:

a. executing a set of mail routines wherein said set of mail routines associates a mailer object to said application program and associates a mailer datum object with data native to said application program to thereby integrate said electronic mail functionality into said application program;

b. inserting an event preprocessor into an event loop of said application program;

c. said event preprocessor displaying said mailer on a first portion of said window along with data processed by said application program displayed in a second portion of said window;

d. providing a set of mail routines which may be invoked by said event preprocessor or said application program to provide electronic mail functions to said application program;

e. said event preprocessor detecting events effecting said mailer and f. responsive to said events effecting said mailer, said event preprocessor processing said events to invoke said mail routines;

wherein said step of providing a set of mail routines which may be invoked by said event preprocessor or said application program to provide said electronic mail functions to said application program includes saving said data processed by said application program as content of mail messages processed by said mail routines and wherein said step of saving said application program data as content of said mail messages processed by said mail routines includes saving multiple representations of said application program data in a mail message processed by said mail routines.

16. The computer implemented method of claim 15 wherein said step of saving said multiple representations of said data includes saving said data in a native format of said application program and in an interchange format.

17. The computer implemented method of claim 15 further comprising the step of said event preprocessor alerting said application program that certain of said events require servicing by said application program.

18. The computer implemented method of claim 17 wherein said step of said event preprocessor alerting said application program that certain of said events require servicing by said application program includes issuing a flag to said application program indicating that said application program should handle said certain of said events.

* * * * *